United States Patent [19]
Suzuki et al.

[11] Patent Number: 6,153,001
[45] Date of Patent: Nov. 28, 2000

[54] INK JET RECORDING INK, METHOD FOR PRODUCING THE SAME, AND INK JET RECORDING METHOD

[75] Inventors: Atsushi Suzuki; Toshitake Yui; Nobuyuki Ichizawa; Kunichi Yamashita; Ken Hashimoto; Yoshiro Yamashita, all of Minami-Ashigara, Japan

[73] Assignee: Fuji Xerox Co., Ltd., Tokyo, Japan

[21] Appl. No.: 09/210,944

[22] Filed: Dec. 15, 1998

[30] Foreign Application Priority Data

Dec. 18, 1997 [JP] Japan ................................ 9-349807
Dec. 18, 1997 [JP] Japan ................................ 9-349808

[51] Int. Cl.$^7$ ............................................. C09D 11/02
[52] U.S. Cl. ..................................... 106/31.65; 106/31.75; 106/31.86
[58] Field of Search ......................... 106/31.65, 31.75, 106/31.86

[56] References Cited

U.S. PATENT DOCUMENTS

| | | | |
|---|---|---|---|
| 5,571,311 | 11/1996 | Belmont et al. | 106/31.6 |
| 5,630,868 | 5/1997 | Belmont et al. | 106/31.75 |
| 5,879,439 | 3/1999 | Nagai et al. | 106/31.65 |
| 5,928,419 | 7/1999 | Uemura et al. | 106/31.65 |
| 5,972,087 | 10/1999 | Uraki et al. | 106/31.65 |

FOREIGN PATENT DOCUMENTS

| | | |
|---|---|---|
| 64-79278 | 3/1989 | Japan . |
| B2-1-49369 | 10/1989 | Japan . |
| 5-230410 | 9/1993 | Japan . |
| 6-128517 | 5/1994 | Japan . |
| 8-3498 | 1/1996 | Japan . |
| 8-81646 | 3/1996 | Japan . |
| 8-319444 | 12/1996 | Japan . |

*Primary Examiner*—Helene Klemanski
*Attorney, Agent, or Firm*—Oliff & Berridge, PLC

[57] ABSTRACT

Disclosed is an ink jet recording ink comprising water, an aqueous organic solvent, a surfactant and a self-dispersible pigment, wherein the number average particle diameter of dispersed particles of the pigment is from 15 to 100 nm, given that mv is the volumetric average particle diameter of the dispersed particles of said pigment and mn is the number average diameter of the dispersed particles of said pigment, mv/mn is less than or equal to 3, the number of particles having a particle diameter greater than or equal to 0.5 μm among the dispersed particles of the pigment contained in one liter of the ink is less than or equal to $7.5 \times 10^{10}$, the surface tension of the ink is less than or equal to 60 mN/m, the electroconductivity of the ink is from 0.05 to 0.4 S/m and the pH of the ink is from 6 to 11. This ink provides a high storage stability and a uniform image having high water-resistance, resolution, and density can be obtained.

18 Claims, No Drawings

INK JET RECORDING INK, METHOD FOR PRODUCING THE SAME, AND INK JET RECORDING METHOD

BACKGROUND OF THE INVENTION

1. Field of the Invention

The present invention relates to an ink jet recording ink used in ink jet recording type recording devices such as printers, copiers, facsimile machines, word processors, and plotters. The present invention also relates to an ink jet recording method using the ink and to a method for producing the ink.

2. Description of the Related art

Inks used in ink jet recording devices primarily comprises a solvent, colorants, and additives. It is required for the ink jet ink to possess the following characteristics.

(1) Inks may produce a uniform image having high resolution and high density and being free from any blur nor fogs on paper.
(2) Inks may brings about no clogging at the tip of a nozzle caused by dried ink and always has high jetting responsibility and stability.
(3) Inks may provide excellent drying characteristics on paper.
(4) Inks may provide an image having good fastness.
(5) Inks may provide have high long-term storage stability.

Various trials have been made to satisfy the above demands. The aforementioned drying characteristics (3) of the ink is important to raise the operational speed of a recording device and prevent color-mixing blur in a color printing operation. For this reason, some improvements have been made in which a solvent having high penetrability and volatility is used and a surfactant is added. In respect of the fastness (4) of an image, there are many disclosures relating to ink using a pigment as the colorant instead of a dye to improve the resistance to water. However, for example, the pigment-containing ink has the drawback that the rubbing resistance is inferior to that of the dye ink although it is improved in the resistance to water. With regard to the long-term storage stability (5), the ink using a pigment usually tends to be inferior in the stability to the ink using a dye. To improve the aforementioned drawbacks in the case of using a pigment, there have been disclosed various methods including a method of introducing a substituted group containing a water solubilizing group into carbon black as disclosed in U.S. Pat. No. 5,571,311, a method of polymerizing an aqueous monomer or the like on the surface of carbon black as disclosed in Japanese Patent Application Laid-Open (JP-A) No. 8-81646, and a method of oxidizing carbon black as disclosed in JP-A Nos. 8-3498 and 8-319444.

Also disclosed are, for example, a method in which no dispersant is used, but an aqueous dispersion containing carbon black stabilized by grafting is used instead (Japanese Patent Application Publication (JP-B) No. 1-49369), a method using ink comprising the carbon black produced by reacting a carbon black with a reactive polymer (JP-A Nos. 1-79278 and 6-128517) and a method using ink in which the carbon black is surface-treated by graft-polymerizing an acrylamide derivative (JP-A No. 5-230410).

As aforementioned, various improving methods have been proposed. However, no method reaches the level sufficiently satisfying the characteristics required for the ink jet, ink. Thus the object characteristics are not attained.

SUMMARY OF THE INVENTION

It is an object of the present invention to provide an ink having the aforementioned characteristics demanded of the ink jet recording ink, a production method of the ink and a recording method using the ink.

In more detail, an object of the present invention is to provide an ink jet recording ink comprising, as a colorant, a pigment to be made hydrophilic. The ink provides an image having high water resistance and has high storage stability. Further, the ink provides a uniform image which is free from any blur and fog on paper and has high resolution and density, brings about no clogging at the tip of a nozzle caused by dried ink, has high jetting responsibility and stability, and possesses excellent drying characteristics on paper.

The inventors of the present invention have found that the above objects can be achieved by the present invention described below.

According to the present invention, there is provided:

(1) an ink jet recording ink comprising water, an aqueous organic solvent, a surfactant and a self-dispersible pigment, wherein the ink has the following characteristics:

(a) the number average particle diameter of dispersed particles of the pigment is from 15 to 100 nm;
(b) given that mv is the volumetric average particle diameter of the dispersed particles of the pigment and mn is the number average particle diameter of the dispersed particles of said pigment, mv/mn is less than or equal to 3;
(c) the number of particles having a particle diameter greater than or equal to 0.5 $\mu$m among the dispersed particles of the pigment contained in one liter of the ink is less than or equal to $7.5 \times 10^{10}$;
(d) the surface tension of the ink is less than or equal to 60 mN/m;
(e) the electroconductivity of the ink is from 0.05 to 0.4 S/m; and
(f) the pH of the ink is from 6 to 11.

(2) Preferably the ink according to (1) has a viscosity from 1.5 to 5.0 mPa·s.
(3) In the ink according to (1) or (2), the surfactant is preferably an anionic surfactant and/or a nonionic surfactant.
(4) Preferably the ink according to any one of (1) to (3) further comprises urea or urea derivatives.
(5) In the ink according to any one of (1) to (4), the drying time, when a solid image at an image area ratio of 100% is printed on regular paper, is preferably less than 10 seconds.
(6) In the ink according to any one of (1) to (5), each amount of Ca, Fe and Si contained in the ink is preferably less than or equal to 10 ppm.
(7) In the ink according to any one of (1) to (6), the self-dispersible pigment is produced by making a carbon black hydrophilic.
(8) In the ink according to any one of (1) to (7), the content of the surfactant is preferably from 0.001 to 4.0% by weight based on the total amount of the ink.
(9) In the ink according to any one of (1) to (8), preferably the number average particle diameter of the dispersed particles of the pigment is from 15 to 60 nm and the mv/mn is less than or equal to 2.2.
(10) In the ink according to any one of (1) to (9), preferably the ink further comprises a monohydric alcohol.
(11) In the ink according to any one of (1) to (10), preferably the surface tension of the ink is from 20 to 40 mN/m, and the content of the surfactant is from 0.5 to 4.0% by weight based on the total amount of the ink.

(12) In the ink according to (11), preferably the drying time, when a solid image at an image area ratio of 100% is printed on regular paper, is less than 5 seconds.

(13) In the ink according to any one of (1) to (10), preferably the ink is used for ink jet recording using a thermal ink jet recording method.

According to another aspect of the present invention, there is provided:

(14) a method for producing the ink as described in (1) to (13), the method comprising at least a step of dispersing a self-dispersible pigment by using at least one of an ultrasonic homogenizer and a high pressure homogenizer.

(15) In the method for producing the ink as described in (1) to (13), the method comprises at least a step of removing bulky particles by centrifugation.

According to a further aspect of the present invention, there is provided:

(16) an ink jet recording method for forming an image on a recording medium by jetting ink droplets from an orifice in accordance with a recording signal, wherein, as the ink, the ink as described in (1) to (13) is used.

(17) In the method according to (16), preferably, one or more aqueous solutions containing a fixing agent is applied to a position and/or a portion adjacent thereto on the recording medium at which an image is formed, at least one of before, after, or at the same time as the ink reaches the recording medium.

(18) In the method according to (17), preferably the fixing agent is an aqueous polymer and/or a polymer emulsion.

(19) In the method according to (17), preferably the aqueous solution further comprises a surfactant and has a surface tension of 20 to 39 mN/m and a viscosity of 1.5 to 5 mPa·s.

(20) In the method according to (17), preferably the pigment in the ink comprises an anionic and hydrophilic functional group and the aqueous solution comprises a nonionic surfactant and/or a cationic surfactant and (a) a fixing agent comprising an aqueous polymer or a polymer emulsion having a cationic group and/or (b) a fixing agent comprising an inorganic polyvalent cation.

In a preferred embodiment, there is provided:

(I-1) an ink jet recording ink comprising water, an aqueous organic solvent, a surfactant and a self-dispersible pigment, wherein the ink has the following characteristics:

(a) the number average particle diameter of dispersed particles of the pigment is from 15 to 100 nm;

(b) given that mv is the volumetric average particle diameter of the dispersed particles of the pigment and mn is the number average particle diameter of the dispersed particles of said pigment, mv/mn is less than or equal to 3;

(c) the number of particles having a particle diameter greater than or equal to 0.5 µm among the dispersed particles of the pigment contained in one liter of the ink is less than or equal to $7.5 \times 10^{10}$)

(d) the surface tension of the ink is from 35 to 60 mN/m;

(e) the viscosity of the ink is from 1.5 to 5.0 mPa·s;

(f) the electroconductivity of the ink is from 0.05 to 0.4 S/m; and (g) the pH of the ink is from 6 to 11.

(I-2) In the ink jet recording ink according to (I-1) the content of the surfactant is preferably 0.001 to 0.5% by weight based on the total amount of the ink.

(I-3) In the ink jet recording ink according to (I-1) or (I-2), the surfactant is preferably an anionic surfactant and/or a nonionic surfactant.

(I-4) Preferably the ink jet recording ink according to any one of (I-1) to (I-3) further comprises a monohydric alcohol.

(I-5) In the ink jet recording ink according to (I-4), the monohydric alcohol preferably includes at least one alcohol selected from the group consisting of an ethyl alcohol, a 2-propanol and a benzyl alcohol.

(I-6) Preferably the ink jet recording ink according to any one of (I-1) to (I-5) further comprises urea or urea derivatives.

(I-7) In the ink jet recording ink according to (I-1), preferably the ink comprises an urea in an amount of 1 to 10% by weight based on the total amount of the ink and a monohydric alcohol, selected from the group consisting of an ethyl alcohol, a 2-propanol and a benzyl alcohol, in an amount of 1 to 5% by weight based on the total amount of the ink and the surfactant is an anionic surfactant and/or a nonionic surfactant, the total amount of the surfactant is from 0.01 to 0.5% by weight based on the total amount of the ink.

(I-8) In the ink jet recording ink according to any one of (I-1) to (I-7), preferably each amount of Ca, Fe and Si contained in the ink is preferably less than or equal to 10 ppm.

(I-9) In the ink according to any one of (I-1) to (I-8) the ink is preferably used for ink jet recording using a thermal ink jet recording method.

(I-10) In the ink jet recording ink according to any one of (I-1) to (I-9), the self-dispersible pigment is preferably produced by making carbon black hydrophilic.

(I-11) Preferably in the ink jet recording ink according to (I-10);

(a) the number average particle diameter of the dispersed particles of the pigment is from 15 to 60 nm;

(b) mv/mn is less than or equal to 2.2;

(c) the number of particles having a particle diameter greater than or equal to 0.5 µm among the dispersed particles of the pigment contained in one liter of the ink is less than or equal to $7.5 \times 10^{10}$;

(d) the surface tension of the ink is from 40 to 60 mN/m;

(e) the viscosity of the ink is from 1.7 to 3.5 mPa·s;

(f) the electroconductivity of the ink is from 0.07 to 0.3 S/m; and (g) the pH of the ink is from 6 to 9.5.

(I-12) The ink jet recording ink according to any one of (I-1) to (I-11) is preferably produced by a method comprising at least one step of dispersing a self-dispersible pigment by using at least one of an ultrasonic homogenizer and a high pressure homogenizer.

(I-13) The ink jet recording ink according to any one of (I-1) to (I-11) is preferably produced by a method comprising at least one step of removing bulky particle by centrifugation.

According to another aspect of this embodiment of the present invention, there is provided:

(I-14) amethod for producing the ink jet recording ink, according to any one of (I-1) to (I-11), the method comprising at least one step of dispersing a self-dispersible pigment by using at least one of an ultrasonic homogenizer and a high pressure homogenizer.

(I-15) In the method for producing the ink jet recording ink, preferably the method comprises at least one step of removing bulky particles by centrifugation.

According a still further aspect of this embodiment of the present invention, there is provided:

(I-16) an ink jet recording method for forming an image on a recording medium by jetting ink droplets from an orifice in accordance with a recording signal, wherein, as the ink, the ink as described in any one of (I-1) to (I-13) is used.

(I-17) In the ink jet recording method according to (I-16), preferably one or more aqueous solutions containing a fixing agent is applied to a position and/or a portion adjacent thereto on the recording medium at which an image is formed, at least one of before, after, or at the same time as the ink reaches the recording medium.

(I-18) In the ink jet recording method according to (I-17), preferably the fixing agent is an aqueous polymer and/or a polymer emulsion.

(I-19) In the ink jet recording method according to (I-17) or (I-18), preferably the aqueous solution further comprises a surfactant and has a surface tension of 20 to 39 mN/m and a viscosity of 1.5 to 5 mPa·s.

(I-20) In the ink jet recording method according to (17), preferably a pigment in the ink comprises an anionic, hydrophilic functional group, and the aqueous solution comprises a nonionic surfactant and/or a cationic surfactant and (a) a fixing agent comprising an aqueous polymer or a polymer emulsion having a cationic group and/or (b) a fixing agent comprising an inorganic polyvalent cation.

The ink jet recording ink of the present invention possesses no conventional problem of the clogging of a jet nozzle which takes place after it is allowed to stand for a long period of time. It is believed that this problem is caused because a hard coagulation is produced at the tip of the jet nozzle when water evaporates and the coagulated portion cannot be removed even by recovery operations such as a suction operation. The present invention solves this problem, although its reason is not clear. It is probably due to the synergetic effect of an appropriately controlled electrical double layer of dispersed particles by addition of the electrolyte primarily comprising a pH adjusting agent, the action of the surfactant as a spacer between the dispersed particles of the pigment and reduced bulky materials contained in an amount less than the prescribed amount. By this synergetic effect, a loose coagulation is formed even when water evaporates from the tip portion of the jet nozzle so that a strong clogging of the nozzle can be avoided. The ink jet recording ink of the present invention can also keep high dispersion stability.

The present invention and its embodiment can provide an ink jet recording ink which has high dispersion stability, brings about no clogging of the nozzle even if it is allowed to stand for a long period of time, possesses remarkably high fixing capability on a variety of papers and produces no cogation when it is used in a thermal ink jet system.

In another preferred embodiment, there is provided:

(II-1) an ink jet recording ink comprising water, an aqueous organic solvent, a self-dispersible pigment and a surfactant, wherein the surface tension of the ink is less than or equal to 40 mN/m and the drying time, when a solid image at an image area ratio of 100% is printed on regular paper is less than 5 seconds.

(II-2) Preferably in the ink according to (II-1);

(a) the number average diameter of dispersed particle of the pigment is from 15 to 100 nm;

(b) given that mv is the volumetric average particle diameter of the dispersed particles of the pigment and mn is the number average particle diameter of the dispersed particles of said pigment, mv/mn is less than or equal to 3; and (c) the number of particles having a particle diameter greater than or equal to 0.5 $\mu$m among the dispersed particles of the pigment contained in one liter of the ink is less or equal to $5.0\times10^{10}$.

(II-3) Preferably the ink according to (II-1) or (II-2) has a surface tension ranging from 20 to 40 mN/m, a viscosity ranging from 1.8 to 4.0 mPa·s and an electroconductivity ranging from 0.03 to 0.4 S/m.

(II-4) Preferably the ink according to (II-1) to (II-3) comprises a surfactant in an amount of 0.5 to 4.0% by weight based on the total amount of the ink.

(II-5) In the ink jet recording ink according to (II-1) to (II-4), preferably each amount of Ca, Fe and Si contained in the ink is preferably less than 5 ppm.

(II-6) In the ink according to (II-1) to (II-5), preferably the self-dispersible pigment is preferably produced by making a carbon black hydrophilic.

According to another aspect of this embodiment of the present invention, there is provided:

(II-7) a method for producing the ink according to (II-1) to (II-6), the method comprising a step of dispersing a self-dispersible pigment in water wherein the dispersing step comprises at least one dispersion step using at least one of an ultrasonic homogenizer and a high pressure homogenizer.

According a further aspect of this embodiment of the present invention, there is provided:

(II-8) an ink jet recording method for forming an image on a recording medium by jetting ink droplets from an orifice in accordance with a recording signal, wherein, as the ink, the ink as described in (II-1) to (II-6) is used.

DESCRIPTION OF THE PREFERRED EMBODIMENTS

The present invention will be explained in detail.

The present invention provides an ink jet recording ink comprising water, an aqueous organic solvent, a surfactant and a self-dispersible pigment, wherein the ink has the following characteristics:

(a) the number average particle diameter of the pigment is from 15 to 100 nm;

(b) given that mv is the volumetric average particle diameter of the dispersed particles of the pigment and mn is the number average particle diameter of the dispersed particles of said pigment, mv/mn is less than or equal to 3;

(c) the number of particles having a particle diameter greater than or equal to 0.5 $\mu$m among the dispersed particles of the pigment contained in one liter of the ink is less than or equal to $7.5\times10^{10}$;

(d) the surface tension of the ink is less than or equal to 60 mN/M;

(e) the electroconductivity of the ink is from 0.05 to 0.4 S/m; and (f) the pH of the ink is from 6 to 11.

The explanations of the present invention will be made by dividing the details of the invention into each constitutional component of the ink, each of the properties of the ink, a production method of the ink and an ink jet recording method to which the ink is applied.

(Self-dispersible pigment)

A pigment used in the ink jet recording ink of the present invention has a functional group on the surface thereof, does not contain a so-called polymer dispersing agent and is self-dispersible in a solvent. In the present invention, the pigment which is self-dispersible in water is defined as those which have many water-solubilizing groups on the surface thereof and disperse stably in water even in the absence of a dispersing agent.

In the present invention, whether the pigment is self-dispersible or not is examined according to the following test method. Specifically, a pigment to be examined is added in a water and dispersed in the absence of a dispersing agent by using an ultrasonic homogenizer, nanomizer, microfuidizer, ball mill or the like. The dispersed pigment is diluted in water such that the initial content of the pigment in the dispersion is about 5%. After the content of the pigment is measured, 100 g of the dispersion is placed in a glass bottle with a diameter of 40 mm and is allowed to stand one day. Then the concentration of the pigment in the upper layer of the dispersion is measured. When the content of the pigment is 98% or more, the pigment is defined as a self-dispersible pigment. This test method is hereinafter called a "self-dispersion test". In this case, no particular limitations is imposed on the method for measuring the content of the pigment and either a method in which the sample is dried to measure a solid content or a method in which the sample is diluted at an appropriate concentration to measure the transmittance of the solution may be used. If there is a method in which the pigment content can be accurately measured, this method may also be used.

As the hydrophilic functional group of the pigment, namely, the water-solubilizing group contained in the surface-modified pigment, any hydrophilic functional group including nonionic, anionic and cationic groups may be used. In particular, a carboxylic group, hydroxyl group, sulfonic acid group or phosphoric acid group may be preferably used either singly or in combinations of two or more. Among these, a carboxylic group alone or a combination of a carboxylic group with one or more of the above compounds is more preferable. When the pigment has a carboxylic group, sulfonic acid group or phosphoric acid group, each of these groups may be used in the state of a free acid as it is. However, it is advantageous and desirable that a part or all of the acid form a salt in light of the dispersibility. As materials forming the salt a counter cation, an alkali metal ion such as $Li^+$, $Na^+$, and $K^+$; ammonia, organic amine or organic onium compound may be preferably used either singly or in combination of two or more.

An amount of the hydrophilic functional groups is not defined in a wholesale manner, because it depends upon the types of the hydrophilic group, and upon the types of salt when the functional group forms a salt. However, for instance, in a case where the hydrophilic group is a —COONa group, the amount of the hydrophilic functional groups is desirably from 0.8 to 4 mmol/g.

Any of inorganic and organic pigments may be used as the pigment into which the hydrophilic functional group is introduced.

As a black pigment, a carbon black pigment such as furnace black, lamp black, acetylene black and channel black is preferable. Examples of compounds which may be used as the black pigment, may include, but are not limited to, Raven 7000, Raven 5750, Raven 5250, Raven 5000 ULTRA, Raven 3500, Raven 2500 ULTRA, Raven 2000, Raven 1500, Raven 1255, Raven 1250, Raven 1200, Raven 1190 ULTRA, Raven 1170, Raven 1080 ULTRA, Raven 1060 ULTRA, Raven 790 ULTRA, Raven 780 ULTRA and Raven 760 ULTRA (manufactured by Colombian Chemicals Co.); Regal 1400R, Regal 1330R, Regal 1660R, Mogul L, Monarch 700, Monarch 800, Monarch 880, Monarch 900, Monarch 1000, Monarch 1100, Monarch 1300 and Monarch 1400 (manufactured by Cabot); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Corp.); No. 25, No. 33, No. 40, No. 47, No. 52, No. 900, No. 2300, MCF-88, MA 600, MA 7, MA 8 and MA 100 (manufactured by Mitsubishi Chemical Corp.). Magnetic microparticles such as magnetite or ferrite; titanium black; or the like may be used as the black pigment.

Examples of a cyan color pigment may include, but are not limited to, C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60.

Examples of a magenta color pigment may include, but are not limited to, C.I. Pigment Red 5, C.I. Pigment Red 7, C.I. Pigment Red 12, C.I. Pigment Red 48, C.I. Pigment Red 48 :1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184 and C.I. Pigment Red 202.

Examples of a yellow color pigment may include, but are not limited to, C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154.

Pigments with specific colors including a red, green, blue, brown and white color, pigments with metallic and glossy colors such as silver and gold, colorless extender pigments, or plastic pigments other than pigments with a black color and three primary colors, namely, a cyan color, magenta color and yellow color may be used. Also, pigments which are newly synthesized for the present invention may be used.

To introduce a hydrophilic functional group into the surface of these pigments, any of known methods and newly invented methods may be used. Known treating methods, for example, acid/base treatment; reduction treatment; oxidizing treatments using an oxidizing agent such as nitric acid, permanganates, bichromates, hypochlorites, ammonium persulfate, hydrogen peroxide, or ozone; treatments using a coupling agent such as silane compounds; polymer grafting treatments; or plasma treatments may be used. These methods may be used in combination.

It is desirable to refine the prepared hydrophilic pigment by removing impurities such as oxidizing agents unremoved and other inorganic and organic impurities. Preferably each content of calcium, iron and silicon in the ink is 10 ppm or less and preferably 5 ppm or less.

Incidentally, in the present invention, each content of these inorganic impurities was measured by means of a high frequency induction coupling plasma emission analysis.

These impurities can be removed, for example, by a method of washing with water, a method using a reverse osmosis membrane or an ultrafilter, an ion exchange method or an adsorbing method using activated carbon or zeolite. These methods may be used either singly or in combination.

As these self-dispersible pigments which are made hydrophilic, in addition to pigments newly produced for the present invention, commercially available pigments which are made hydrophilic may be used. Examples of the commercially available self-dispersible pigments may be Microjet Black CW-1 (manufactured by Orient Chemical Industries Ltd.), Cab-o-jet-200, Cab-o-jet-300 and IJX-55 (manufactured by Cabot) as well as pigments which are available from Nippon Shokubai Co., Ltd.

The aforementioned self-dispersible pigments which are made hydrophilic should satisfy the requirement of the present invention in which "○" the number of particles having a particle diameter greater than or equal to 0.5 $\mu$m among the dispersed particles of the pigment contained in one liter of the ink is less than or equal to $7.5 \times 10^{10}$. Because of this, bulky particles may be removed to reduce the number of particles having a particle diameter greater than or equal to 0.5 $\mu$m in advance, for example, by dispersion treatment, centrifugation, or filtration, when the pigment is in the state of dispersion in water.

An amount of the self-dispersible pigment used in the ink jet recording ink of the present invention is from 0.1 to 20 parts by weight, preferably from 0.5 to 20% by weight, more preferably from 0.5 to 15 parts by weight, still more preferably from 1 to 10 parts by weight and most preferably from 2 to 10% by weight. When the amount of the pigment is too large, the tip of the nozzle tends to be clogged and the rubbing resistance of an image is reduced, undesirably. On the contrary, when the amount is too small, of course, brings about an only insufficient density.

The number average particle diameter of the dispersed particles of the pigment in the ink is designed to be from 15 to 100 nm, preferably from 15 to 70 nm, more preferably from 15 to 60 nm and still more preferably from 15 to 50 nm. If the number average particle diameter of dispersed particles is within the range, the clogging can be caused with difficultyand the storage stability is improved. When the number average dispersion particle diameter is less than 15 nm, the viscosity of the ink is increased and hence a clogging tends to be produced, since the surface area per unit volume of a particle increases and the contact area between particles in the ink tends to increase as. On the contrary, when the average particle diameter is too large, the pigment tends to result in, for example, the coagulation or precipitation due to an unstable dispersion. When, particularly, carbon black which is made hydrophilic is used as the self-dispersible pigment, the number average particle diameter is preferably controlled in a range of 15 to 60 nm in view of the shelf stability of the ink.

The size distribution mv/mn represented by the ratio of the volumetric average particle diameter mv to the number average particle diameter mn of the pigment in the ink is preferably 3 or less, more preferably 2.5 or less and still more preferably 2.2 or less. A dispersion having a wider size distribution tends to induce the coagulation and precipitation of the pigment in which a part of large dispersion particles acts as the core, even if the number average dispersion particle diameter is within the above-described range. Hence the penetrative rate and rubbing resistance of the ink tends to be low. Particularly when carbon black which is made hydrophilic is used as the self-dispersible pigment, the size distribution is desirably 2.2 or less in view of the rubbing resistance of an image. It is noted that the size distribution mv/mn is 1 in a monodispersion state and the actual size distribution be preferably close to this value, but it is 1.1 or more since such a monodistribution condition in which the size distribution mv/mn is 1 can be attained with difficulty.

To attain such a size distribution, the amount of the surfactant described below is designed to fall in an appropriate range.

In the present invention, the particle diameter of dispersion particles of the pigment was measured using a microtrack UPA size analyzer 9340 (manufactured by Leeds & Northrup) without diluting an ink (hereinafter called "ink to be tested") in which the pigment to be measured is dispersed. As the viscosity and the density which are the parameters to be input in the measurement, the viscosity of ink to be tested and the density of the pigment were input respectively. The latter density was 1.8 $g/cm^2$ when, for example, a pigment produced by treating carbon black hydrophilically is used.

The number of particles having a particle diameter greater than or equal to 0.5 $\mu$m among the dispersed particles of the pigment contained in one liter of the ink is designed to be less than or equal to $7.5 \times 10^{10}$, preferably less than or equal to $5 \times 10^{10}$, and more preferably less than or equal to $3 \times 10^{10}/dm^3$. When the number of particles having a particle diameter greater than or equal to 0.5 $\mu$m exceeds $7.5 \times 10^{10}$, the reliability of the print tends to be decreased.

When the number of particles falls in the above defined range, a burning of the ink on a heater can be restrained, particularly, in the case of using a system in which heat energy is allowed to act on the ink thereby jetting the ink. When a large amount of a surfactant is added to shorten drying time, the use of the self -dispersible pigment may suppress the number of particles having a particle size greater than 0.5 $\mu$m whereas generic pigment dispersions tend to increase in the number of particles.

In the present invention, an Accusizer TM 770 Optical Particle Sizer (manufactured by Particle Sizing Systems) was used as an instrument for measuring the number of particles having a particle size greater than or equal to a size larger than 0.5 $\mu$m. This instrument is the type detecting particles, passing through the measuring section, by means of an optical technique. The measurement is made according to the measuring method specified for the above measuring instrument after 2 $\mu$l of the measurement subject ink is placed in a measuring cell. The value converted into the number of particles in one liter of the sample is used in the present invention.

(Surfactant)

The ink jet recording ink of the present invention comprises a surfactant. The surfactant used in the present invention is not utilized as a dispersing agent for the pigment but is intended to provide the effect of aiding to increase the dispersion stability of the self-dispersible pigment and the effect of allowing the ink to penetrate into paper used as the recording medium. Therefore, the amount of the surfactant can be reduced more greatly than in the case where it is used as a dispersant, giving rise to no problems of, for example, an impaired printing image and printing voids due to foams. These surfactants not only give the effect of increasing the penetrating rate but also contribute to an improvement in the cleaning capability of a wiper cleaning an ink jet head.

Examples of the types of surfactant used in the ink jet recording ink of the present invention may be various anionic, nonionic, cationic and ampholyric surfactants. Among these, anionic or nonionic surfactants are preferably used.

Examples of the anionic surfactant include an alkylbenzene sulfonate, an alkylphenyl sulfonate, alkylnaphthalene sulfonate, a higher fatty acid salt, a sulfate of a higher fatty acid ester, a sulfonate of a higher fatty acid ester, a higher alcohol ether sulfate and sulfonate, a higher alkyl sulfosuccinate, a polyoxyalkylene alkyl ether carboxylate, a polyoxyethylene alkyl ether carboxylate, apolyoxyethylene-alkyl ether sulfate, analkyl phosphate, a polyoxyalkylene alkyl ether phosphate, a polyoxyethylene alkyl ether phosphate, a formalin condensate of a naphthalene sulfonate, a polystyrene sulfonate, a polyacrylate, an alkyl sulfate, and acrylic acid/acrylate copolymer.

Preferable examples include a dodecylbenzene sulfonate, an allylbenzene sulfonate, an isopropylnaphthalene sulfonate, a monobutylphenylphenol monosulfonate, a monobutylbiphenyl sulfonate and a dibutylphenylphenol sulfonate.

Examples of the nonionic surfactant include polyoxyethylene alkyl ethers, polyoxyethylene alkylphenyl ethers, polyoxyethylene fatty acid esters, sorbitan fatty acid esters, polyoxyethylenesorbitan fatty acid esters, polyoxyethylenesorbitol fatty acid esters, glycerol fatty acid esters, polyoxyethylene glycerol fatty acid esters, polyglycerol fatty acid esters, sucrose fatty acid esters, polyoxyethylenealkylamines, polyoxyethylene fatty acid amides, alkylalkanolamides, an acetylene glycol, an oxyethylene adduct of acetylene glycol, polyethylene glycol/polypropylene glycol block copolymers, a polyoxyethylene sterol, polyoxyethylenepolyoxypropylene alkyl ethers, polyoxyethylene/polyoxypropylene block copolymers, tetramethyldecynediols and an ethylene oxide adduct of tetramethyldecynediol.

Preferable examples include a polyoxyethylene nonyl phenyl ether, a polyoxyethylene octyl phenyl ether, a polyoxyethylene dodecylphenyl ether, a polyoxyethylene alkyl ether, a polyoxyethylene fatty acid ester, a sorbitan fatty acid ester, a polyoxyethylenesorbitan fatty acid ester, a fatty acid alkylolamide, an acetylene glycol, an oxyethylene adduct of acetylene glycol and polyethylene glycol/polypropylene glycol block copolymers.

In addition to the above compounds, for example, silicone-type surfactants such as an oxyethylene adduct of polysiloxane and fluorine-based surfactants such as perfluoroalkyl carboxylates, perfluoroalkyl sulfonates and oxyethylene perfluoroalkyl ethers or biosurfactants such as spiculisporic acid, rhamnolipid and lysolecithin may be used.

Examples of the cationic surfactant may include alkylamine salts and alkyl or aromatic quaternary ammonium salts. Examples of the amphoteric surfactant may include betaines, aminocalboxylates and imidazoline derivatives.

These surfactants may be used either singly or in combination. The HLB of the surfactant is from 5 to 25 and preferably from 7 to 20 in consideration of the penetrability and solubilization stability of the surfactant in the ink.

An amount of the surfactants used in the ink jet recording ink of the present invention is from 0.001 to 4.0% by weight based on the total amount of the ink. In an embodiment of the present invention, the amount of the surfactants is greater than 0.001% by weight and less than 0.5% by weight and more preferably from 0.01 to 0.2% by weight. When the amount of the surfactant is less than 0.001% by weight, the effect of the present invention can be obtained with difficulty.

In another embodiment, the amount of the surfactant is preferably from 0.5 to 4.0% by weight and more preferably from 0.7 to 3.0% by weight. If the amount is too small, the ink provides only insufficient penetrability and thus the requirement of the present invention in which drying time when a solid image at an image area ratio of 100% is printed on regular paper is less than 5 seconds cannot be achieved. If the amount is too large, an image is readily blurred and, at the same time, the dispersion size distribution is made wide whereby the coagulation and precipitation of the pigment and the clogging of a nozzle tend to be caused.

(Water)

All type of waters may be used as water used in the ink jet recording ink of the present invention. It is preferable to use ion exchange water, superpure water, distilled water and ultrafiltered water to avoid the contamination of impurities.

(Aqueous organic solvent)

The aqueous organic solvent of the present invention is frequently used to prevent water from evaporating from the ink jet ink. Examples of materials used as the aqueous organic solvent for the ink jet recording ink of the present invention include polyhydric alcohols such as ethylene glycol, diethylene glycol, propylene glycol, butylene glycol, triethylene glycol, 1,5-pentanediol, 1,2,6-hexanetriol, trimethylolpropane, glycerin, polyethylene glycol and dipropylene glycol; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether and dipropylene glycol monobutyl ether; lower alcohols such as ethanol, isopropyl alcohol and 1-propanol; nitrogen-containing solvents such as pyrrolidone, 2-pyrrolidone, N-methyl-2-pyrrolidone, cyclohexylpyrrolidone, monoethanolamine, diethanolamine and triethanolamine; sulfur-containing solvents such as thiodiethanol, 2-mercaptoethanol, thiodiglycerol, sulfolane and dimethyl sulfoxide; propylene carbonate; ethylene carbonate; and sugars sugar-alcohols and their derivatives such as glucose, fructose, galactose, mannose and xylose.

Highly hydrophobic solvents tend to impair the dispersibility of the self-dispersible pigment and thus the SP value is preferably 12 or more.

These aqueous organic solvents may be used either singly or in combinations of two or more. An amount of the aqueous organic solvent is preferably from 1 to 60% by weight, more preferably from about 3 to 50 parts by weight and most preferably from 5 to 40% by weight based on the total amount of the ink.

(Other ink components)

In the ink jet recording ink of the present invention, it is desirable to add a monohydric alcohol in view of the drying of ink on recording paper after a printing operation. Examples of the monohydric alcohol include aliphatic alcohols having 4 or less carbons and benzyl alcohol. Preferable examples include ethanol, isopropyl alcohol and benzyl alcohol. These alcohols may be used either singly or in combination of two or more. An amount of the monohydric alcohol is preferably from 1 to 5% by weight and more preferably from 2 to 4% by weight based on the total amount of the ink. When the amount is less than 1% by weight, there is the case where the drying time of an image is prolonged whereas when the amount exceeds 5% by weight, an image blur tends to increase and the density tends to decrease.

In the ink jet ink of the present invention, it is preferable that urea or urea derivatives be added to prevent a jet nozzle from being clogged. More preferably urea is added. Examples of the urea derivatives used in the present invention may include 1,1-dimethylurea, 1,3-dimethylurea, 1,1-diethylurea, 1,3-diethylurea, thiourea, ethyleneurea, ethylenethiourea, methylthiourea and dimethylthiourea. An amount of urea or urea derivatives is from 0.5 to 15 parts by weight, preferably from 1 to 10% by weight and more preferably from 3 to 8% by weight based on the total amount of the ink. When the amount is too low, a clogging tends to be caused whereas when the amount is too large, image blurs tend to increase and the density tends to decrease.

To control the pH of the ink, a pH regulating agent is used. Examples of the pH regulating agent include acids such as hydrochloric acid, sulfuric acid, nitric acid, acetic acid, citric acid, oxalic acid, malonic acid, boric acid, phosphoric acid, phosphorous acid and lactic acid; bases such as potassium hydroxide, sodium hydroxide, lithium hydroxide, ammonium hydroxide, triethanolamine, diethanolamine, ethanolamine, 2-amino-2-methyl-1-propanol and ammonia; and pH buffers such as phosphates, oxalates, amine salts and good buffers.

In addition to the above-mentioned compounds, polyethyleneimines, polyamines, polyvinylpyrrolidone, polyethylene glycol, cellulose derivatives such as ethyl cellulose and carboxymethyl cellulose, polysaccharides and their derivatives, as well as aqueous polymers, polymer emulsion such as an acrylic-type polymer emulsion and polyurethane-type emulsion, cyclodextrin, polycyclodextrin, large ring amines, dendrimer, crown ethers, acetoamides and betaines may be used.

Moreover, other additives such as antioxidants, mildewproofing agents, viscosity regulating agents, electroconductive agents, UV-absorbers, and chelating agents as well as aqueous dyes, dispersion dyes, oil-soluble dyes may be added, if desired.

(Properties of ink)
(d) Surface tension

The surface tension of the ink jet recording ink of the present invention is preferably from 20 mN/m to 60 mN/m. When the surface tension is lower than the above defined range, blurs are easily produced when a printing is made on regular paper and hence no image with high resolution can be obtained. On the other hand, the surface tension higher than the above defined range posseses the problems of low penetrability and prolonged drying time of an image. In an embodiment of the present invention, the surface tension is from 35 to 60 mN/m and preferably from 40 to 50 mN/m. Particularly when carbon black is used as the self-dispersible pigment, the surface tension is preferably 40 to 60 mN/m to prevent the production of blurs and to obtain an image with high resolution.

In an embodiment of the present invention, the drying time of a solid image at an image area ratio of 100% which is printed on regular paper is preferably 5 seconds or less provided that the surface tension of the ink is 40 mN/m or less. In this case, when the surface tension is too large, the ink provides a poor wettability against a recording material and thus the drying properties and the rubbing resistance are not improved. On the other hand, when the surface tension is too low, the ink provides an excessive wettability against a recording material, rendering it easy to produce blurs and to cause strike-through. The surface tension is controlled mainly by addition of a surfactant. Other than the effect of the surfactant, for example, the influences of the types and amounts of the aqueous organic solvent and self-dispersible pigment are considered.

In the present invention, the solid image at an image area ratio of 100% means a solid image in which the amount of ink per unit area is in a range from about 1.2 to 2.0 mg/cm$^2$. In order that the drying time of a solid image with an image area ratio of 100% which is printed on regular paper is 5 seconds or less, the ink preferably comprises a penetrant. As the penetrant, the aforementioned surfactant is preferably used.

In the present invention, the surface tension was measured using a WILHELMY surface tension balance in the condition of 23° C. and 55% RH.

(e) Viscosity

The viscosity of the ink jet recording ink of the present invention is controlled to fall in a range from 1.5 to 5.0 mPa·s (for example, from 1.8 to 4.0 mPa·s) and preferably from 1.5 to 3.5 mPa·s. When the viscosity is lower than 1.5 mPa·s, the storage stability of the ink is reduced. On the other hand, when the viscosity is higher than 5.0 mPa·s, the jetting power is reduced, posing the problem of impossible recovery of the jetting nozzle from clogging. Particularly when carbon black which is made hydrophilic is used as the self-dispersible pigment, the viscosity is preferably from 1.7 to 3.5 mPa·s in view of the jetting capability of the ink.

In the present invention, the viscosity was measured using a measuring instrument, Rheomat 115 (manufactured by Contraves) at 23° C. and a shear rate of 1400 s$^{-1}$ after the ink to be tasted was placed in a measuring container which was installed in the instrument according to a prescribed method.

(f) Electroconductivity

The electroconductivity of the ink jet recording ink of the present invention is controlled to fall in a range from 0.03 to 0.4 S/m, preferably from 0.05 to 0.4 S/m, more preferably from 0.05 to 0.3 S/m and most preferably from 0.07 to 0.3 S/m. When the electroconductivity is too low, the jetting condition will be recovered with difficulty when the ink is allowed to stand for a log period of time after a printing operation is suspended. When the electroconductivity is too high, the storage stability of the ink tends to be deteriorated. It is considered that this is due to the reduced dispersibility based on the balance between the dissociation of the surface of the self-dispersible pigment and an electrical double layer in the surrounding of pigment particles. Particularly when carbon black which is made hydrophilic is used as the self-dispersible pigment, the electroconductivity is preferably in a range from 0.07 to 0.3 S/m in view of the recovery of the jetting capability of the ink after long period suspension. In the present invention, the electroconductivity was measured using a conductivity meter AOL-40-3302 (manufactured by DKK) at 23° C.

(g) pH

The pH of the ink jet recording ink of the present invention is controlled to fall in a range from 4 to 12, preferably from 5 to 11, more preferably from 6.0 to 11.0 and most preferably from 7.5 to 9.0. When the pH is too low, the clogging easily takes place whereas when the pH is too high, materials forming the head are easily corroded and dissolved. Particularly when carbon black which is made hydrophilic is used as the self-dispersible pigment, the pH is preferably in a range from 6.0 to 9.5 in consideration of clogging of the nozzle. In the present invention, the pH was measured using a glass pH electrode at 23° C.

(Method for production of ink)

The ink jet recording ink of the present invention can be obtained by mixing, dissolving and dispersing the aforementioned components. In the method of the present invention, it is preferable to provide at least one step of dispersing a pigment in an aqueous medium to adjust the particle diameter of the aforementioned self-dispersible pigment to the prescribed size of dispersion particles in the present invention.

In the step of dispersing a pigment in an aqueous medium, various stirring and dispersing apparatuses may be used.

However, when a dispersing machine using so-called dispersing media such as a ball or beads of glass, ceramics or metals are used, there are many cases where the pigment dispersion solution and the ink are contaminated with a large amount of inorganic impurities produced by the wears of the dispersing media and dispersing containers in a milling and dispersing step. It is therefore desirable to use a dispersing machine using no dispersing media. It is particularly desirable to perform the dispersion by using at least one of an ultrasonic homogenizer and a high pressure homogenizer. Preferably the dispersion using the ultrasonic homogenizer is performed after defoaming and deaeration operations are carried out, for example, using a vacuum suction apparatus, a heating apparatus, and a defoaming/deaerating apparatus. When a dispersing apparatus using dispersion media is used, the contaminated inorganic impurities are removed in advance, if desired.

In order that the number of particles having a particle diameter greater than or equal to 0.5 $\mu$m among the dispersed particles of the pigment contained in one liter of the ink is controlled to fall in the aforementioned range, it is preferable to provide at least one step of removing bulky particles by centrifugation after the dispersion step.

Bulky particles are removed, if necessary, by filtration or the like and then the prescribed solvents and additives are added. The resulting dispersion is mixed and stirred and the resulting mixture is filtered again to produce an ink. Alternatively, a water dispersion of the pigment which is made hydrophilic and the prescribed solvents and additives are added and mixed with stirring and then bulky particles are removed by dispersing treatment, centrifugation or filtration, to produce an ink.

(Ink jet recording apparatus)

The ink jet recording ink of the present invention can be used, of course, in so-called general ink jet recording apparatuses which form an image on a recording medium by jetting ink droplets corresponding to recording signals and also in recording apparatuses mounted with a heater for aiding the fixing of the ink to the recording medium as well as in recording apparatuses which are mounted with an intermediate transfer mechanism and transfer, to a record medium, e.g. paper, printed matter on the intermediate transfer material.

(Ink jet recording method)

The ink jet recording ink of the present invention is applied to an ink jet recording method in which an image is formed on a record medium by jetting ink droplets in accordance with recording signals. Examples of recording methods used in the ink jet recording method include a so-called charge control method jetting ink by utilizing electrostatic induction force, a pressure pulse method jetting ink by utilizing the vibration pressure of a piezo element and a thermal ink jet method forming ink droplets by making use of the pressure produced by forming and growing air cells under heat in ink. Among these methods, the thermal ink jet method is preferable since it provides, especially, a full color image which can be small-sized and inexpensive.

In a recording step using the aforementioned ink jet recording method, of course, an image can be formed using only the ink jet recording ink of the present invention. The position and/or portions adjacent thereto on which the image is to be formed by ink may be traced with one or more aqueous solutions. The tracing with the aqueous solutions may be performed at any of the time just before or just after or at the same time when the ink reaches the surface of a recording medium or at the plural times selected from the combinations of two or more of these times.

The aqueous solution to be printed at the position overlapped or portions adjacent thereto preferably comprises a fixing agent, although the solution may include a colorant. As the fixing agent, various aqueous polymers and/or polymer emulsions may be used. For instance, an acrylic polymer, polyester, polyvinyl alcohol, polyvinylpyrrolidone and polyurethane are preferable. It is morepreferable that these polymers comprise a functional group which will bind a hydrophilic functional group of the pigment contained in the ink. A combination of an ink comprising a pigment having an anionic, hydrophilic functional group and a fixing agent comprising an aqueous polymer having a cationic group is especially preferable.

Preferable examples of the aqueous polymer having a cationic group include copolymers or monopolymers comprising at least monomers having a cationic functional group such as N,N-dimethylaminoethylmethacrylate, N,N-dimethylaminoethylacrylate, N,N-dimethylaminomethacrylamide, N,N-dimethylaminoacrylamide, vinylpyridine and vinylpyrrolidone, polyethyleneimine, polyamines and polyamides.

When the hydrophilic, functional group contained in the pigment used in the ink comprises an anionic group, it is also preferable that the fixing agent comprises an inorganic polyvalent cation. Examples of such an inorganic polyvalent cation include $Ca^{2+}$, $Mg^{2+}$, $Al^{3+}$, $Fe^{2+}$, $Fe^{3+}$, $Zn^{2+}$, $Ni^{2+}$, $Co^{2+}$ and $Cu^{2+}$.

Preferably the aqueous solution comprises a surfactant and is controlled to have a surface tension from 20 to 39 mN/m and a viscosity from 1.5 to 5 mPa sinview of the drying capability of an image. Such a surfactant is preferably a nonionic surfactant and/or a cationic surfactant. Specific examples of the nonionic surfactant and cationic surfactant are the same as those described in the embodiment of the ink jet recording ink.

In an embodiment, increased amount of Mg and Fe in the ink promotes the coagulation of the pigment and tends to increase a burning of the ink on a heater when using a recording method in which ink is jetted by acting heat energy. It is therefore preferable that the amount of Mg and Fe in the ink be, for instance, less than 5 ppm. Mg and Fe may be removed by washing with water, by using a reverse osmosis membrane/ultrafilter membrane, by utilizing an ion exchange resin or by adsorbing with activated carbon or zeolite. These methods being used either singly or in combination. Mg and Fe, because these metals are derived from the pigment, may be removed according to an efficient and appropriate method from the pigment itself, the pigment dispersion or the ink.

In the recording method of jetting ink by the action of heat energy, these inks are superior to CB inks using a usual dispersant with regard to the dispersion stability, showing that these inks have an effect on the improvement in a burning on a heater. Also the plurality of pulses is applied to form one liquid droplet, which is then jetted, whereby the amount of a drop is made stable, bringing about the effect of improving the jetting stability in a continuous jetting operation.

In an embodiment, the ink of the present invention may be mixed with a fixing agent on a recording material, to obtain a firmly fixed image with high resolution and density. The fixing agent is a material which suppresses the penetration of a colorant contained in the ink. Examples of the fixing agent include a polyvalent metal salts, organic amines and salts thereof, quaternary ammonium salts, cationic polymers, nonionic polymers and anionic polymers. These fixing agents in a form of an aqueous solution or the like may be applied to a recording material before or after or at the same time when the ink is recorded on the recording material. An effective and efficient method of applying the aqueous solution to the recording material may be jetting it in accordance with signals in the same manner as in the case of the ink.

In an embodiment, there is provided an ink jet recording ink comprising, as essential components, water, an aqueous organic solvent, a pigment which is self-dispersible in water and a surfactant, wherein the ink has the following characteristics: the surface tension of the ink is less than or equal to 40 mN/m, and drying time, when a solid image at an image area ratio of 100% is printed on regular paper, is less than 5 seconds. This ink has a high drying rate on paper, excellent water-resistance and rubbing resistance, high long-term storage stability, and high printing quality, without problem of clogging. The mechanism of the aforementioned improvement is achieved by adding the pigment, which is self-dispersible in water together with the surfactant. The mechanism is estimated as follows, although it is not bound to the clarified theory.

As for the dispersion stability of the ink, in the case of general pigment dispersion inks, a water-insoluble pigment is dispersed without being coagulated and precipitated by the function of a dispersing agent which adsorbs to the pigment. On the other hand, the pigment which is self-dispersible in water according to the present invention is self-dispersed in water in the absence of a dispersing agent. In general, when a large amount of penetrants is present in the ink, it is considered that a dispersant gradually moves away from a pigment to which the dispersant adsorbs and there is the possibility that the pigment is coagulated and precipitated if the interaction between the penetrant and the dispersant is strong. However, the self-dispersible pigment is free from such a trouble. As for the drying capability and printing quality, these qualities are considered to be resulted from the following reason. Specifically, since the pigment is larger in size than a dye, the pigment can pass through the voids of a recording material with difficulty even if the same penetrant is used. Thus, excessive penetration is restrained, blurs and a strik-through are reduced, even though the drying rate is high. As for the rubbing resistance, it is considered as follows. In general, the ink having a high surface tension has poor wettability to a recording material. However, in the present invention, the surface tension is reduced to less than or equal to 40 mN/m which improves the wettability. For this reason, the contact area between the ink and the recording material is widened whereby the fixing capability is improved. As for the clogging, the ink of the present invention is more advantageous than conventional pigment dispersion inks since there is no adverse influence of the interaction between the dispersant and the penetrant, when the ratio of the penetrant increases on the surface of the nozzle.

EXAMPLES

The present invention will be illustrated in more detail by way of the following examples and comparative examples.

Example I
(Example of preparation of self-dispersible hydrophilic pigment dispersion)

Preparative Example I-1

CAB-O-JET300 (manufactured by Cabot) is treated in an ultrasonic homogenizer (power: 300 W) for 30 minutes and is centrifuged (7,000 r.p.m., 20 minutes). The centrifuged pigment dispersion is filtered through a 5 µm membrane filter and further a 1 µm membrane filter to obtain a hydrophilic pigment dispersion I-A (the content of a pigment solid: 14%). The resulting hydrophilic pigment dispersion I-A is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment.

Preparative Example I-2

CAB-O-JET300 (manufactured by Cabot) is treated in a high-pressure homogenizer M110-E/H (manufactured by Microfluidics International Corp.) under a pressure of 1,500 kg/cm$^2$ through five paths and is filtered through a 5 µm membrane filter and further a 1 µm membrane filter to obtain a hydrophilic pigment dispersion I-B (the content of a pigment solid: 16.3%). The resulting hydrophilic pigment dispersion I-B is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment.

Preparative Example I-3

CAB-O-JET300 (manufactured by Cabot) is centrifuged (7,000 r.p.m., 20 minutes) to prepare a pigment dispersion, which is then filtered through a 5 µm membrane filter and further a 1 µm membrane filter to obtain a hydrophilic pigment dispersion I-C (the content of a pigment solid: 13.5%). The resulting hydrophilic pigment dispersion I-C is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment.

Preparative Example I-4

MICROJET BLACK CW-1 (manufactured by Orient Chemical Industries Ltd.) is centrifuged (5,000 r.p.m., 20 minutes) and is then filtered through a 5 µm membrane filter and further a 1 µm membrane filter to obtain a hydrophilic pigment dispersion I-D (the content of a pigment solid: 18.7%). The resulting hydrophilic pigment dispersion I-D is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment. (Examples I-1 to I-5 and Comparative Examples I-1 to I-6)

Example I-1

| Component | Parts by weight |
| --- | --- |
| Hydrophilic pigment dispersion I-A | 28.6 |
| Diethylene glycol | 15 |
| 2-propanol | 3 |

-continued

| Component | Parts by weight |
|---|---|
| Polyoxyethylene oleyl ether (oxyethylene: 30 mols) | 0.1 |
| Urea | 6 |
| N,N-bis(2-hydroxyethyl)-2-aminoethanesulfonic acid | 0.6 |
| NaOH | 0.12 |
| Pure water | 46.58 |

The components of the above composition are mixed and filtered through an 1 µm membrane filter to obtain an ink jet recording ink of Example I-1.

Example I-2

| Component | Parts by weight |
|---|---|
| Hydrophilic pigment dispersion I-A | 28.6 |
| Diethylene glycol | 15 |
| Polyoxyethylene oleyl ether (oxyethylene: 30 mols) | 0.03 |
| NaOH | 0.07 |
| Pure water | 56.3 |

The components of the above composition are mixed and filtered through an 1 µm membrane filter to obtain an ink jet recording ink of Example I-2.

Example I3

| Component | Parts by weight |
|---|---|
| Hydrophilic pigment dispersion I-B | 24.5 |
| Diethylene glycol | 15 |
| Ethyl alcohol | 3 |
| Polyoxyethylene oleyl ether (oxyethylene: 15 mols) | 0.002 |
| N,N-bis(2-hydroxyethyl)-2-aminoethanesulfonic acid | 0.3 |
| NaOH | 0.12 |
| Pure water | 57.08 |

The components of the above composition are mixed and filtered through an 1 µm membrane filter to obtain an ink jet recording ink of Example I-3.

Example I-4

| Component | Parts by weight |
|---|---|
| Hydrophilic pigment dispersion I-C | 29.6 |
| Diethylene glycol | 15 |
| Oxyethylene adduct of acetylene glycol | 0.1 |
| Sodium dodecylbenzene sulfonate | 0.1 |
| Urea | 6 |
| N,N-bis(2-hydroxylethyl)-2-aminoethanesulfonic acid | 0.3 |
| NaOH | 0.12 |
| Pure water | 48.78 |

The components of the above composition are mixed and filtered through an 1 µm membrane filter to obtain an ink jet recording ink of Example I-4.

Example I-5

| Component | Parts by weight |
|---|---|
| Hydrophilic pigment dispersion I-D | 26.7 |
| Diethylene glycol | 10 |
| Glycerol | 5 |
| Triethylene glycol | 5 |
| 2-propanol | 3 |
| Polyoxyethylene/polyoxypropylene block copolymer | 0.3 |
| Urea | 6 |
| N,N-bis(2-hydroxyethyl)-2-aminoethanesulfonic acid | 0.6 |
| NaOH | 0.12 |
| Pure water | 43.28 |

The components of the above composition are mixed and filtered through an 1 µm membrane filter to obtain an ink jet recording ink of Example I-5.

Comparative Example I-1

CAB-O-JET 300 (manufactured by Cabot) is filtered through a 10 µm membrane filter to obtain a hydrophilic pigment dispersion I-J (the content of a pigment solid: 16%). The resulting hydrophilic pigment dispersion I-J is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment.

| Component | Parts by weight |
|---|---|
| Hydrophilic pigment dispersion I-J | 25 |
| Diethylene glycol | 15 |
| 2-propanol | 3 |
| Polyoxyethylene oleyl ether (oxyethylene: 30 mols) | 0.1 |
| Urea | 6 |
| NaOH | 0.07 |
| Pure water | 50.83 |

The components of the above composition are mixed and filtered through an 5 µm membrane filter to obtain an ink jet recording ink of Comparative Example I-1.

Comparative Example I-2

| Component | Parts by weight |
|---|---|
| Hydrophilic pigment dispersion I-A | 28.6 |
| Diethylene glycol | 15 |
| 2-propanol | 3 |
| Urea | 6 |
| NaOH | 0.07 |
| Pure water | 47.33 |

The components of the above composition are mixed and filtered through an 1 µm membrane filter to obtain an ink jet recording ink of Comparative Example I-2.

Comparative Example I-3

| Component | Parts by weight |
|---|---|
| Hydrophilic pigment dispersion I-C | 29.6 |
| Diethylene glycol | 15 |
| 2-propanol | 3 |
| Polyoxyethylene oleyl ether (oxyethylene: 30 mols) | 0.1 |
| Urea | 6 |
| N,N-bis(2-hydroxylethyl)-2-aminoethanesulfonic acid | 1.2 |
| NaOH | 0.24 |
| Pure water | 44.86 |

The components of the above composition are mixed and filtered through an 1 μm membrane filter to obtain an ink jet recording ink of Comparative Example I-3.

Comparative Example I-4

| Component | Parts by weight |
|---|---|
| Hydrophilic pigment dispersion I-C | 29.6 |
| Diethylene glycol | 15 |
| 2-propanol | 3 |
| Polyoxyethylene oleyl ether (oxyethylene: 30 mols) | 0.1 |
| Urea | 6 |
| N,N-bis(2-hydroxyethyl)-2-aminoethanesulfonic acid | 0.3 |
| Pure water | 46 |

The components of the above composition are mixed and filtered through an 1 μm membrane filter to obtain an ink jet recording ink of Comparative Example I-4.

Comparative Example I-5

| Component | Parts by weight |
|---|---|
| Hydrophilic pigment dispersion I-D | 26.7 |
| Diethylene glycol | 10 |
| Glycerol | 5 |
| Triethylene glycol | 5 |
| 2-propanol | 3 |
| Polyoxyethylene/polyoxypropylene block copolymer | 0.3 |
| Urea | 6 |
| Pure water | 44 |

The components of the above composition are mixed and filtered through an 1 μm membrane filter to obtain an ink jet recording ink of Comparative Example I-5.

Comparative Example I-6

| Component | Parts by weight |
|---|---|
| Hydrophilic pigment dispersion I-D | 26.7 |
| Diethylene glycol block copolymer | 15 |
| Pure water | 58.27 |

The components of the above composition are mixed and filtered through an 1 μm membrane filter to obtain an ink jet recording ink of Comparative Example I-6.

(Measurement of properties)

Each ink jet recording ink prepared in the above Examples I-1 to I-5 and Comparative Examples I-1 to I-6 is subjected to a measurement of each property shown below. The method for measuring each property is described below. The results obtained are shown in Table 1.

(1) Surface tension of each ink (mN/m)
(2) Viscosity of each ink (mPa·s)
(3) Electroconductivity of each ink (S/m)
(4) pH of each ink
(5) Number average particle diameter, and volumetric average particle diameter/number average particle diameter
(6) Number of particles with a size of 0.5 μm or more (number/liter)
(7) Contents (ppm) of calcium (Ca), iron (Fe) and silicon (Si) in ink

TABLE 1

| Unit | (1) Surface tension of ink mN/m | (2) Viscosity of ink mPa/s | (3) Electroconductivity of ink S/m | (4) pH of ink | (5) Number average particle diameter of dispersion particles of pigment nm | (6) mv/mn | (7) Number of particles of pigment with a size of 0.5 μm or more ×10$^{10}$/l | (8) Ca ppm | Fe ppm | Si ppm |
|---|---|---|---|---|---|---|---|---|---|---|
| Ex. I-1 | 49 | 2.3 | 0.24 | 8.9 | 35 | 1.9 | 4.8 | <1 | <1 | <1 |
| Ex. I-2 | 57 | 1.7 | 0.07 | 9.1 | 34 | 1.9 | 4.9 | <1 | <1 | <1 |
| Ex. I-3 | 50 | 2.1 | 0.18 | 8.5 | 31 | 1.8 | 3.2 | <1 | <1 | <1 |
| Ex. I-4 | 37 | 2.0 | 0.20 | 8.7 | 44 | 1.9 | 6.1 | <1 | <1 | <1 |
| Ex. I-5 | 41 | 3.5 | 0.11 | 7.5 | 22 | 1.8 | 0.8 | 9.0 | 1.3 | 1.2 |
| C.E.* I-1 | 49 | 2.3 | 0.23 | 8.9 | 47 | 2.0 | 8.0 | <1 | <1 | <1 |
| C.E.* I-2 | 53 | 2.2 | 0.24 | 8.9 | 34 | 1.9 | 4.8 | <1 | <1 | <1 |
| C.E.* I-3 | 47 | 2.8 | 0.44 | 9.3 | 21 | 11.7 | 4.7 | <1 | <1 | <1 |
| C.E.* I-4 | 49 | 2.9 | 0.20 | 5.8 | 45 | 2.0 | 5.0 | <1 | <1 | <1 |
| C.E.* I-5 | 45 | 3.6 | 0.04 | 7.1 | 22 | 1.8 | 0.9 | 9.0 | 1.4 | 1.1 |
| C.E.* I-6 | 61 | 1.7 | 0.07 | 7.1 | 23 | 1.7 | 1.0 | 9.1 | 1.3 | 1.1 |

*C.E.: Comparative Example (Various performance tests)

Each ink jet recording ink prepared in the above Examples I-1 to I-5 and Comparative Examples I-1 to I-6 is subjected to various performance tests shown below. The results are shown in Table 2.

(8) Test for dispersion stability 50 g of the ink is sealed in a capped glass tube and is subjected to an acceleration test in which it is allowed to stand at 70° C. for 4 hours and in succession at -20° C. for 4 hours in one cycle and this cycle is repeated four times. 5 g of the ink is sampled respectively before and after the test. Each sample is filtered under reduced pressure through 1 μm filter in a glass holder with an effective filter 2 diameter of 2.5 cm². The time required for all amount of the sample to be filtered is measured and is examined according to the following criteria.

○: An increase in the time to pass, through the filter, the sample taken after the acceleration test is less than 20%.

Δ: An increase in the time to pass, through the filter, the sample taken after the acceleration test is greater than 20% and less than 50%.

×: An increase in the time to pass, through the filter, the sample taken after the acceleration test is greater than 50%.

(9) Test for clogging characteristics

Using a trial ink jet printer (a thermal ink jet type, 600 dpi, droplets: about 25 ng), it is allowed to stand at 23° C. and 55% RH without capping after the injection is stopped to measure the time passed by until an image disorder takes place after the injection is restarted. The examination is made according to the following criteria.

○: The time is longer than or equal to 60 seconds.

Δ: The time is longer than or equal to 30 seconds and less than 60 seconds.

×: The time is less than 30 seconds.

(10) Test for recovery from clogging

Using the aforementioned printer, it is allowed to stand at 23° C. and 55% RH for one month after it is confirmed that a normal printing can be made. Recovery procedures using a vacuum operation are repeated until a normal printing can be made. The number of the repetitions is recorded and examined according to the following criteria.

⊚: Recovered by one or less recovery operation.

○: Recovered by two or three recovery operations.

Δ: Recovered by four or five recovery operations.

×: Not recovered even by five recovery operations.

(11) Cogation test

Using the same printer as described above, $1 \times 10^8$ pulses per nozzle are continuously injected on FX-L paper (manufactured by Fuji Xerox) and a change in the dot diameter is measured and examined according to the following criteria.

⊚: change in the dot diameter is less than 2.5% based on the initial dot diameter.

○: A change in the dot diameter is greater than or equal to 2.5% and less than 5% based on the initial dot diameter.

Δ: A change in the dot diameter is greater than or equal to 5% and less than 10% based on the initial dot diameter.

A change in the dot diameter is greater than or equal to 10% based on the initial dot diameter.

(12) Test for evaluation of image quality

A printing test is made on FX-L paper (manufactured by Fuji Xerox) and 4024 paper (manufactured by Xerox) by using the above printer and a sensorial evaluation is made according to the following criteria.

⊚: No blur is observed.

○: A slight blur is observed within an allowable range.

Δ: Some blurs are observed.

×: A mustache-like blur is observed in many portions.

(13) Anti-rubbing test

In the printing test, a solid printing portion is printed, the day after it is rubbed by a finger and the sensorial evaluation is made according to the following criteria.

⊚: No trace of abrasion is observed

○: A slight trace of abrasion is observed within an allowable range.

Δ: Some traces of abrasion are observed.

×: A heavy trace of abrasion is observed.

TABLE 2

|  | (8) Dispersion stability test | (9) Clogging characteristic test | (10) Test for recovery from clogging | (11) Cogation test | (12) Test for evaluation of image quality | (13) Rubbing resistance test | (14) Test for evaluation of drying quality |
| --- | --- | --- | --- | --- | --- | --- | --- |
| Ex. I-1 | ○ | ○ | ⊚ | ⊚ | ⊚ | ○ | ○ |
| Ex. I-2 | ○ | ○ | ○ | ○ | ⊚ | ○ | ○ |
| Ex. I-3 | ○ | ○ | ⊚ | ○ | ⊚ | ○ | ○ |
| Ex. I-4 | ○ | ○ | ○ | ⊚ | ○ | ⊚ | ○ |
| Ex. I-5 | ○ | ○ | ⊚ | ⊚ | ○ | ⊚ | ○ |
| C.E.* I-1 | ○ | ○ | X | Δ | ⊚ | ○ | Δ |
| C.E.* I-2 | ○ | Δ | X | ○ | ⊚ | ○ | Δ |
| C.E.* I-3 | X | Δ | Δ | X | ○ | Δ | ○ |
| C.E.* I-4 | Δ | X | X | X | ○ | Δ | Δ |
| C.E.* I-5 | ○ | X | X | Δ | ○ | ○ | Δ |
| C.E.* I-6 | ○ | Δ | X | Δ | ⊚ | X | X |

*C.E.: Comparative Example

(14) Test for evaluation of drying quality

A solid printing part is printed on FX-L paper (manufactured by Fuji Xerox) in the same manner as in the above printing test. FX-L paper (manufactured by Fuji Xerox) is overlapped on the printed image and a load of 100 g/cm² is further applied to the FX-L paper. The time passed by from the time when the solid printing part is printed to the time when the ink is not transferred to the overlapped FX-L paper is measured and examined according to the following criteria.

○: Less than 10 seconds.
Δ: Longer than or equal to 10 seconds and less than 20 seconds.
×: Longer than or equal to 20 seconds.

Examples I-6 to I-11 and Comparative Examples I-7

Example I-6

CAB-O-JET300 (manufactured by Cabot) is dispersed by treating in a beads mill (media: 0.5 mm glass beads) for one hour. After the beads are removed, the dispersed product is centrifuged (7,000 r.p.m., 20 minutes). The centrifuged pigment dispersion is filtered through a 5 $\mu$m membrane filter and further through an 1 $\mu$m membrane filter to obtain a hydrophilic pigment dispersion I-E (the content of a pigment solid: 13.5%). The resulting hydrophilic pigment dispersion I-E is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment.

The same procedure as in Example I-1 is carried out except that the pigment dispersion I-E is used instead of the pigment dispersion used in Example I-1 and the amounts of the pigment dispersion and pure water are altered to 29.6 parts by weight and 45.58 parts by weight respectively, to obtain an ink jet recording ink of Example I-6.

Example I-7

The ink jet recording ink I-7 is prepared in the same manner as in Example I-6 except that the hydrophilic pigment dispersion is further treated using a reverse osmosis membrane.

Example I-8

| Component | Parts by weight |
| --- | --- |
| CAB-O-JET 300 (manufactured by Cabot) | 24.2 |
| Diethylene glycol | 10 |
| Sulfolane | 5 |
| 2-propanol | 3 |
| Benzyl alcohol | 2.5 |
| Polyoxyethylene oleyl ether (oxyethylene: 30 mols) | 0.1 |
| Urea | 10 |
| N,N-bis(2-hydroxyethyl)-2-aminoethanesulfonic acid | 0.6 |
| NaOH | 0.12 |
| Pure water | 44.48 |

The components of the above composition are mixed, treated in an ultrasonic homogenizer (power: 300 W) for 30 minutes and filtered through an 1 $\mu$m membrane filter to obtain an ink jet recording ink of Example I-8. Incidentally, CAB-O-JET 300 (manufactured by Cabot) is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment.

Example I-9

CAB-O-JET 300 (manufactured by Cabot) is dispersed by treating in an ultrasonic homogenizer (Power: 300 W) and the dispersed product is centrifuged (6,000 r.p.m., 20 minutes). The centrifuged pigment dispersion is filtered through a 5 $\mu$m membrane filter and further through an 1 $\mu$m membrane filter to obtain a hydrophilic pigment dispersion I-F (the content of a pigment solid: 18.4%). The resulting hydrophilic pigment dispersion I-F is diluted with water such that the content of a pigment solid is 5% and is subjected to the aforementioned self-dispersibility test to determine whether it is self-dispersible or not. As a result, the concentration of a pigment after the test is 100% of its start concentration, showing that it is a self-dispersible pigment.

| Component | Parts by weight |
| --- | --- |
| Hydrophilic pigment dispersion I-F | 24.46 |
| Thiodiethanol | 15 |
| 2-propanol | 3 |
| Polyoxyethylene oleyl ether (oxyethylene: 30 mols) | 0.1 |
| Urea | 10 |
| N,N-bis(2-hydroxyethyl)-2-aminoethanesulfonic acid | 0.3 |
| NaOH | 0.06 |
| Pure water | 47.06 |

The components of the above composition are mixed and filtered through an 1 $\mu$m membrane filter to obtain an ink jet recording ink of Example I-9.

Example I-10

Acidic carbon black (trademark: Raven 5750, manufactured by Colombian Chemicals Co.), the primary particle diameter: 12 nm, pH: 2.1) is treated using sodium hypochlorite and is desalted using a reverse osmosis membrane. The resulting water dispersion is adjusted to a pH of 8.5 by addition of 2N NaOH and is dispersed by treating in an ultrasonic homogenizer (Power: 300 W). The dispersion is centrifuged at 8,000 r.p.m. for 30 minutes. The centrifuged pigment dispersion is filtered through an 1 $\mu$m membrane filter to obtain a hydrophilic pigment dispersion I-G (the content of a pigment solid: 8.5%). The resulting hydrophilic pigment dispersion I-G is diluted with water such that the content of a pigment solid is 5% and is subjected to the aforementioned self-dispersibility test to determine whether it is self-dispersible or not. As a result, the concentration of a pigment after the test is 99.2% of its start concentration, showing that it is a self-dispersible pigment.

| Component | Parts by weight |
| --- | --- |
| Hydrophilic pigment dispersion I-G | 56.5 |
| Diethylene glycol | 15 |
| 2-propanol | 3 |
| Polyoxyethylene oleyl ether (oxyethylene: 30 mols) | 0.1 |
| NaOH | 0.05 |
| Urea | 1.5 |
| Pure water | 23.85 |

The components of the above composition are mixed and filtered through an 1 $\mu$m membrane filter to obtain an ink jet recording ink of Example I-10.

Comparative Example I-7

10 parts by weight of the same acidic carbon black as in Example I-10, 2.5 parts by weight of a Na salt of a styrene-acrylic acid copolymer (weight average molecular weight: about 10,000) and 87.5 parts by weight of pure water are mixed and stirred. The mixture is dispersed by treating in an ultrasonic homogenizer (power: 300 W) and is centrifuged at 8,000 r.p.m. for 30 minutes to obtain a pigment water dispersion X (the content of a pigment solid: 7.9%). The above acidic carbon black is diluted with water such that the content of a pigment solid is 5% and is subjected to the aforementioned self-dispersibility test to determine whether it is self-dispersible or not. As a result, the concentration of a pigment after the test is 0% of its start concentration, showing that it is not a self-dispersible pigment.

The same procedure as in Example I-10 is carried out except that the pigment dispersion X is used instead of the pigment dispersion used in Example I-10 and the amounts of the pigment dispersion and pure water are altered to 60.8 parts by weight and 19.55 parts by weight respectively, to obtain an ink jet recording ink of Comparative Example I-7.

Example I-11

An acrylic acid monomer is polymerized on the surface of a copper phthalocyanine pigment (C.I. Pigment Blue-15:1) to form a grafted pigment, followed by treatment with NaOH aq. to obtain Na salt of the pigment. Then, the Na salt is dispersed by treating in an ultrasonic homogenizer and is then centrifuged (7,000 r.p.m., 20 minutes). The centrifuged pigment dispersion is filtered through a 5 $\mu$m membrane filter and further through a 2 $\mu$m filter to obtain a hydrophilic pigment dispersion I-H (the content of a pigment solid: 7.9%). The resulting hydrophilic pigment dispersion I-H is diluted with water such that the content of a pigment solid is 5% and is subjected to the aforementioned self-dispersibility test to determine whether it is self-dispersible or not. As a result, the concentration of a pigment after the test is 98.2% of its start concentration, showing that it is a self-dispersible pigment.

| Component | Parts by weight |
|---|---|
| Hydrophilic pigment dispersion I-H | 40.5 |
| Diethylene glycol | 10 |
| 2-pyrrolidone | 5 |
| 2-propanol | 3 |
| Oxyethylene adduct of acetylene glycol | 0.2 |
| N,N-bis(2-hydroxyethyl)-2-aminoethanesulfonic acid | 0.6 |
| NaOH | 0.12 |
| Pure water | 40.58 |

The components of the above composition are mixed and filtered through an 1 $\mu$m membrane filter to obtain an ink jet recording ink of Example I-11.

Comparative Example I-8

The same procedure as in Example I-10 is carried out except that the centrifuging condition is altered to 5,000 r.p.m. and 20 minutes, to obtain a hydrophilic pigment dispersion I-I (pigment solid content: 8.9%). The resulting hydrophilic pigment dispersion I-I is diluted with water such that the content of a pigment solid is 5% and is subjected to the aforementioned self-dispersibility test to determine whether it is self-dispersible or not. As a result, the concentration of a pigment after the test is 99% of its start concentration, showing that it is a self-dispersible pigment.

| Component | Parts by weight |
|---|---|
| Hydrophilic pigment dispersion I-I | 54 |
| Diethylene glycol | 15 |
| 2-propanol | 3 |
| Polyoxyethylene oleyl ether (oxyethylene: 30 mols) | 0.1 |
| NaOH | 0.05 |
| Urea | 1.5 |
| Pure water | 26.35 |

The components of the above composition are mixed and filtered through an 1 $\mu$m membrane filter to obtain an ink jet recording ink of Comparative Example I-8.

(Measurement of properties and various performance tests)

Each ink jet recording ink prepared in the above Examples I-6 to I-11 and Comparative Examples I-7 and I-8 is subjected to measurements of the aforementioned test (1) to (7) and the aforementioned various performance tests (8) to (14) in the same manner as in Examples I-1 to I-5 and Comparative Examples I-1 to I-6. The results are shown in Table 3.

TABLE 3

| | (1) Surface tension of ink | (2) Viscosity of ink | (3) Electroconductivity of ink | (4) pH of ink | (5) Number average particle diameter of dispersion particles of pigment | (6) | (7) Number of particles of pigment with a size of 0.5 $\mu$m or more | (8) | | |
|---|---|---|---|---|---|---|---|---|---|---|
| Unit | mN/m | mPa/s | S/m | — | nm | mv/mn | $\times 10^{10}$/l | Ca ppm | Fe ppm | Si ppm |
| Ex. I-6 | 49 | 2.4 | 0.23 | 8.9 | 37 | 1.8 | 4.9 | 11.2 | 12.8 | 29 |
| Ex. I-7 | 49 | 2.3 | 0.24 | 8.9 | 35 | 1.8 | 4.7 | 3 | 2 | 9 |
| Ex. I-8 | 45 | 2.7 | 0.29 | 8.4 | 31 | 2.0 | 3.8 | <1 | <1 | <1 |
| Ex. I-9 | 47 | 2.4 | 0.26 | 8.0 | 28 | 1.8 | 1.2 | <1 | <1 | <1 |
| Ex. I-10 | 48 | 2.0 | 0.15 | 8.6 | 25 | 1.9 | 2.5 | <1 | <1 | <1 |
| C.E.* I-7 | 45 | 2.5 | 0.25 | 8.5 | 34 | 2.2 | 6.3 | 1.2 | <1 | <1 |
| Ex. I-11 | 40 | 2.3 | 0.31 | 8.4 | 40 | 2.1 | 3.0 | <1 | <1 | <1 |
| C.E.* I-8 | 48 | 2.1 | 0.14 | 8.5 | 28 | 3.7 | 4.5 | <1 | <1 | <1 |

TABLE 3-continued

|  | (8) Dispersion stability test | (9) Clogging characteristic test | (10) Test for recovery from clogging | (11) Cogation test | (12) Test for evaluation of image quality | (13) Rubbing resistance test | (14) Test for evaluation of drying quality |
|---|---|---|---|---|---|---|---|
| Ex. I-6 | ○ | ○ | ◎ | ○ | ◎ | ○ | ○ |
| Ex. I-7 | ○ | ○ | ◎ | ◎ | ◎ | ○ | ○ |
| Ex. I-8 | ○ | ○ | ◎ | ◎ | ◎ | ○ | ○ |
| Ex. I-9 | ○ | ○ | ◎ | ◎ | ◎ | ○ | ○ |
| Ex. I-10 | ○ | ○ | ◎ | ○ | ○ | ○ | ○ |
| C.E.* I-7 | Δ | X | Δ | ○ | ○ | ○ | ○ |
| Ex. I-11 | ○ | ○ | ○ | ○ | ○ | ○ | ○ |
| C.E.* I-8 | Δ | X | X | X | ○ | ○ | ○ |

*C.E.: Comparative Example

Example II

The present invention will be illustrated in more detail by way of examples and comparative examples.

In the following examples, as the criteria to determine whether the dispersion material is self-dispersible in water or not, the aforementioned criteria is used.

As for the dispersion condition, for example, when an ultrasonic homogenizer is used, the subject material is dispersed using an output power 300 W for about 30 minutes.

In the following examples and comparative examples, the value determined according to the above criteria is shown as "[self-dispersibility:]" to express the self-dispersibility of the pigment used.

Example II-1

CAB-O-JET 300 (manufactured by Cabot) is diluted such that the content of carbon is 10% by weight. The diluted material is centrifuged (8000 r.p.m., 40 minutes) to obtain a pigment dispersion solution II-A (the content of carbon: 8.5% by weight). [Self-dispersibility: 100%]

| Component | Parts by weight |
|---|---|
| Pigment dispersion solution II-A | 50 |
| Polyoxyethylene/polyoxypropylene block polymer (HLB: about 12) | 2 |
| Glycerol (SP value: about 20) | 15 |
| Pure water | 33 |

The above components are sufficiently mixed and filtered under pressure through an 1 μm filter to prepare an ink.

Example II-2

Microjet Black CW-1 (manufactured by Orient Chemical Industries Ltd.) is centrifuged (7000 r.p.m., 30 minutes) to obtain a pigment dispersion solution II-B (the content of carbon: 16.5% by weight). [Self-dispersibility: 100%]

| Component | Parts by weight |
|---|---|
| Pigment dispersion solution II-B | 30 |
| Surfynol 465 (HLB: about 13) | 1 |
| Urea | 5 |
| Ethylene glycol (SP value: about 18) | 20 |
| Pure water | 44 |

The above components are sufficiently mixed and filtered under pressure through an 1 μm filter to prepare an ink.

Example II-3

| Component | Parts by weight |
|---|---|
| Pigment dispersion solution II-A | 50 |
| Polyoxyethylene/polyoxypropylene block polymer (HLB: about 12) | 6 |
| Glycerol (SP value: about 20) | 15 |
| Pure water | 29 |

The above components are sufficiently mixed and filtered under pressure through an 1 μm filter to prepare an ink.

Example II-4

CAB-O-JET 300 (manufactured by Cabot) is treated in an ultrasonic homogenizer for 30 minutes and is centrifuged (7000 r.p.m., 20 minutes) to obtain a pigment dispersion solution II-C (the content of carbon: 12.8%). [Self-dispersibility: 100%]

| Component | Parts by weight |
|---|---|
| Pigment dispersion solution II-C | 40 |
| Propylene glycol (SP value: about 16) | 20 |
| Surfynol 440 (HLB: about 6) | 0.7 |
| Surfynol 485 (HLB: about 16) | 1.3 |
| Ethylene urea | 3 |
| Pure water | 35 |

The above components are sufficiently mixed and filtered under pressure through an 1 μm filter to prepare an ink.

Example II-5

Microjet Black CW-1 (manufactured by Orient Chemical Industries Ltd.) is diluted to have a concentration of 10% and is then centrifuged (8000 r.p.m., 20 minutes). The centrifuged material is filtered under pressure through a 5 μm filter and in succession through a 2 μm filter to obtain a pigment dispersion solution II-D (the content of carbon: 7.9% by weight). [Self-dispersibility: 100%]

| Component | Parts by weight |
| --- | --- |
| Carbon black dispersion solution II-D | 50 |
| Diethylene glycol (SP value: about 15) | 10 |
| 2-pyrrolidone (SP value: about 13) | 5 |
| Polyethylene glycol fatty acid ester (HLB: about 11) | 3 |
| Pure water | 32 |

The above components are sufficiently mixed and filtered under pressure through an 1 μm filter to prepare an ink.

Example II-6

Carbon black (Raven 5750) is subjected to surface oxidizing treatment which is carried out by mixing sodium hyposulfite in an amount of 1.7 equivalents by weight to carbon black in water and stirring at 95° C. for 10 hours. After the treated carbon black is desalted, the pH is adjusted to 7.5. The resulting carbon black is dispersed in pure water as the solvent in an ultrasonic homogenizer and is then centrifuged (7,000 r.p.m., 20 minutes) to obtain a hydrophilic pigment dispersion II-E (the content of a pigment solid: 15%). [Self-dispersibility: 99%]

| Component | Parts by weight |
| --- | --- |
| Pigment dispersion solution II-E | 30 |
| Triethylene glycol (SP value: about 14) | 10 |
| Polyoxyethylene alkyl ether carboxylate (HLB: about 20) | 1.5 |
| N,N-bis(2-hydroxyethyl)-2-aminoethaneslfonic acid | 0.5 |
| NaOH | 0.1 |
| Pure water | 58 |

The above components are sufficiently mixed and filtered under pressure through an 1 μm filter to prepare an ink.

Example II-7

Carbon black (Mitsubishi MA-100) is subjected to graft polymer treatment which is performed by subjecting carbon black to peroxidizing treatment using Sodium persulfate and by adding Sodium styrene sulfonate in an amount of about 0.2 g based on 1 g of carbon black, followed by stirring. Then, the grafted carbon black is dispersed in pure water as the solvent by treating in an ultrasonic homogenizer (power: 300 W) for 40 minutes and is then centrifuged (8,000 r.p.m., 40 minutes) to obtain a pigment dispersion solution II-F (carbon content: 7.8%). [Self-dispersibility: 98.5%]

| Component | Parts by weight |
| --- | --- |
| Pigment dispersion solution II-F | 60 |
| Thiodiethanol (SP value: about 14) | 10 |
| Polyoxyethylene octylphenyl ether (HLB: about 9) | 2.0 |
| Urea | 5 |
| Pure water | 23 |

The above components are sufficiently mixed and filtered under pressure through an 1 μm filter to obtain an ink.

Example II-8

Carbon black (Special BK 4A) which is treated using plasma (treating condition: high frequency voltage is applied to carbon black in the presence of $O_2$ gas to discharge thereby performing the surface treatment of carbon black) is dispersed in water as the solvent in a high pressure homogenizer (7000 r.p.m., 30 minutes) for 40 minutes such that the content of carbon is 20%. The treated carbon black is then centrifuged (7,000 r.p.m., 30 minutes) to obtain a pigment dispersion solution II-G (carbon content: 15.6%). [Self-dispersibility: 99.5%]

| Component | Parts by weight |
| --- | --- |
| Pigment dispersion solution II-G | 30 |
| Trimethylol propane (SP value: about 15) | 10 |
| Glycerol (sp value: about 20) | 10 |
| Polyoxyethylene sorbitan fatty acid ester (HLB: about 7) | 2 |
| Pure water | 48 |

The above components are sufficiently mixed and filtered under pressure through an 1 μm filter to prepare an ink.

Example II-9

| Component | Parts by weight |
| --- | --- |
| Pigment dispersion solution II-A | 3 |
| N-methyl-2-pyrrolidone (SP value: about 11) | 20 |
| Polyoxyethylene perfluoroalkyl ether (HLB: about 13) | 0.01 |
| Polyoxyethylene nonylphenyl ether (HLB: about 8) | 1.5 |
| Urea | 6 |
| Pure water | 69.5 |

The above components are sufficiently mixed and filtered under pressure through an 1 μm filter to prepare an ink.

Example II-10

| Component | Parts by weight |
| --- | --- |
| Pigment dispersion solution II-B | 30 |
| Propylene glycol (SP value: about 13) | 15 |
| Isopropyl alcohol (SP value: about 12) | 3 |
| Polyoxyethylene oleyl ether (HLB: about 12) | 1.5 |
| EDTA | 0.1 |
| Pure water | 50.4 |

The above components are sufficiently mixed and filtered under pressure through an 1 μm filter to prepare an ink.

Example II-11

| Component | Parts by weight |
| --- | --- |
| Pigment dispersion solution II-E | 30 |
| 1,5-pentanediol (SP value: about 13) | 10 |
| Diethylene glycol monohexyl ether (SP value: about 10) | 2 |
| Sodium p-toluene sulfonate | 0.3 |
| Surfynol 440 (HLB: about 6) | 1.0 |
| Pure water | 56.7 |

The above components are sufficiently mixed and filtered under pressure through an 1 μm filter to prepare an ink.

Example II-12

| Component | Parts by weight |
| --- | --- |
| Pigment dispersion solution II-C | 35 |
| Glucose (SP value: about 19) | 15 |
| Polyoxyethylene adduct of silicone (HLB: about 7) | 3 |
| Styrene-acrylate-acrylic acid emulsion | 1 |
| Urea | 3 |
| PROXEL GXL | 0.03 |
| Pure water | 43 |

The above components are sufficiently mixed and filtered under pressure through an 1 μm filter to prepare an ink.

Example II-13

A phthalocyanine pigment which is treated using plasma (treating condition: high frequency voltage is applied to phthalocyanine in the presence of $O_2$ gas to discharge thereby performing the surface treatment of the pigment) is dispersed using water as the solvent in a high pressure homogenizer (7000 r.p.m., 30 minutes) for 40 minutes such that the content of the pigment is 20%. The treated pigment is then centrifuged (7,000 r.p.m., 30 minutes) and treated using activated carbon. The resulting pigment is filtered through a 5 μm filter to obtain a pigment dispersion solution II-H (carbon content: 14.7%). [Self-dispersibility: 99%]

| Component | Parts by weight |
| --- | --- |
| Pigment dispersion solution II-H | 28 |
| Glycerol (SP value: about 20) | 18 |
| Polyoxyethylene polyoxypropylene alkyl ether (HLB: about 10) | 1.5 |
| Ethanol (SP value: about 14) | 0.5 |
| N-(2-acetoamide)iminodiacetic acid | 0.5 |
| KOH | 0.1 |
| Pure water | 51.4 |

The above components are sufficiently mixed and filtered under pressure through a 2 μm filter to prepare an ink.

Example II-14

| Component | Parts by weight |
| --- | --- |
| Pigment dispersion solution II-D | 5 |
| 1,2,6-hexanetriol (SP value: about 14) | 10 |
| Ethylene glycol (SP value: about 18) | 10 |
| Oxyethylene oleyl ether (HLB: about 10) | 1.3 |
| Pure water | 73.7 |

The above components are sufficiently mixed and filtered under pressure through an lam filter to prepare an ink. The ink is evaluated in a printing test using the method in which drive signals experimentally produced and consisting of a main pulse, a prepulse and a quiescent time between the prepulse and main pulse are applied to form one droplet. Using a thermal ink jet printer with a resolution of 600 dpi, tests for evaluating an image quality, rubbing resistance, resistance to clogging and storage stability of ink are made. The results of these tests are all "○" which means good.

Example II-15

An ink is prepared using the same composition in the same manner as in Example II-13 except that the steps of centrifugation and adsorption using activated carbon are omitted.

Example II-16

| Component | Parts by weight |
| --- | --- |
| Pigment dispersion solution II-B | 30 |
| Surfynol 465 (HLB: about 13) | 0.1 |
| Urea | 5 |
| Ethylene glycol (SP value: about 18) | 20 |
| Pure water | 40 |

The above components are sufficiently mixed and filtered under pressure through an 1 μm filter to prepare an ink.

Comparative Example II-1

| Component | Parts by weight |
| --- | --- |
| Pigment dispersion solution II-A | 50 |
| Glycerol (SP value: about 20) | 10 |
| Pure water | 40 |

The above components are sufficiently mixed and filtered under pressure through an 1 μm filter to prepare an ink.

Comparative Example II-2

| Component | Parts by weight |
| --- | --- |
| Carbon black (Regal 330R) [Self-dispersibility: not dispersible and gels] | 5 |
| Methacrylic acid-butyl methacrylate copolymer sodium salt | 1 |
| Surfynol 465 (HLB: about 13) | 1 |

-continued

| Component | Parts by weight |
|---|---|
| Urea | 5 |
| Ethylene glycol (SP value: about 18) | 20 |
| Pure water | 68 |

A carbon black dispersion solution is prepared from carbon black, the Methacrylic acid-butyl methacrylate copolymer sodium salt and pure water (preparative condition: a dispersion operation is performed for 30 minutes by using an ultrasonic homogenizer (power: 1200 W)). Then, other components are sufficiently mixed with the carbon black solution and the mixture is filtered under pressure through an 1 µm filter to prepare an ink.

Comparative Example II-3

| Component | Parts by weight |
|---|---|
| Carbon black (Mitsubishi MA-100) [Self-dispersibility: less than 50%] | 5 |
| Styrene-maleic acid copolymer Lithium salt | 1 |
| Surfynol 465 (HLB: about 13) | 0.05 |
| Urea | 5 |
| Ethylene glycol (SP value: about 18) | 20 |
| Pure water | 69 |

A carbon black dispersion solution is prepared from carbon black, the styrene-maleic acid copolymer Lithium salt copolymer and pure water. Then, other components are sufficiently mixed with the carbon black solution and the mixture is filtered under pressure through an 1 µm filter to prepare an ink.

(Evaluation of ink)

The qualities of the inks prepared in the above Examples II-1 to II-16 and Comparative Examples II-1 to II-3 are evaluated according to the following evaluating criteria. The following items (1) to (5) are measured according to the foregoing methods.

(1) Surface tension of ink
(2) Viscosity of ink
(3) Electroconductivity of ink
(4) Number average dispersion particle diameter and/or dispersion size distribution of ink
(5) Number of particles with a size of 0.5 µm or more which are contained in ink
(6) Amounts of Mg and Na contained in ink The ink is diluted in pure water to measure the contents of Mg and Fe in a dilution solution of the ink by using an ICP element analysis instrument, these contents being converted into the contents in the ink.

(7) Amount of ink drop

Using a trial head having a resolution of 600 dpi, ink of (¼) tone (2035×128 dots) is jetted three times at a frequency of 6 kHz in the condition of 23° C. and 55% RH. The jetted ink is received by a bit of an ink absorber and the weight of the ink absorber is measured to calculate the amount of jetted one drop.

(8) Drying time test

Using a thermal ink jet printer having a resolution of 600 dpi which is experimentally produced for the evaluation, a solid image is printed at an area ratio of 100% in a range of 10 mm×50 mm on FX-L paper (manufactured by Fuji Xerox) used as the typical regular paper in the condition of 23° C. and 55% RH to measure the time passed by until no droplet is visually found on the paper after the printing is finished.

(9) Image quality test

The prepared ink is subjected to a printing test in which a solid image of one dot line is printed on FX-L paper (manufactured by Fuji Xerox) used as the typical regular paper by using a thermal ink jet printer having a resolution of 600 dpi which is experimentally produced for the evaluation. A blur of a line and the uniformity of the periphery of a solid image are observed as the evaluation items and are examined according to the following criteria.

a) Blur of a line

○: No blur is found.
  Δ: A slight blur is found.
  ×: A mustache-like blur is observed in many parts.

b) Uniformity of a solid

○: No disorder is found.
  Δ: Slight disorder is found.
  ×: The solid is rough and deficient in smoothness.

(10) Rubbing resistance test

In a thermal ink jet printer having a resolution of 600 dpi which is experimentally produced for the evaluation, an image is printed using the prepared ink. The image portion is rubbed with the finger one day after the printing is made to evaluate the color fade of and stains on the image portion according to the following criteria.

○: Neither a reduction in the image density is observed nor stains on a non-image portion is found.
  Δ: Almost no reduction in the image density is observed but slight stains are found on a non-image portion.
  ×: A reduction in the image density is observed and noticeable stains are found on a non-image portion.

(11) Clogging-resistance test

A thermal ink jet printer having a resolution of 600 dpi which is experimentally produced for the evaluation is allowed to stand in the condition of 23° C. and 55% RH without being capped after the jetting of the prepared ink is terminated, to measure the retention time until an image disorder takes place after the jetting of the ink restarts. The evaluation is made according to the following criteria.

○: The retention time is longer than or equal to one minute.
  Δ: The retention time is longer than or equal to 0.5 minutes and less than one minute.
  ×: The retention time is less than 0.5 minutes.

(12) Storage stability test of ink

The prepared ink, after it is stored at 60° C. and −20° C. for one month, is refiltered through an 1 µm filter. In a thermal ink jet printer having a resolution of 600 dpi, a printing operation is carried out using the refiltered ink. The evaluation is made according to the following basis.

○: No change in the filterability is observed and there is no change in the image density before and after the storage.
  Δ: A slight reduction in the filtering rate is observed but there is no change in the image density after the storage.
  ×: severe clogging of the filter caused by the ink is observed and there is a great reduction in the image density.

The above results are shown in Table 4.

TABLE 4

Results of evaluation of the compositions in
Example II and Comparative Example II

|  | Ex. II-1 | Ex. II-2 | Ex. II-3 | Ex. II-4 | Ex. II-5 |
|---|---|---|---|---|---|
| Surface tension of ink (mN/m) | 36 | 29 | 35 | 27 | 34 |
| Viscosity of ink (mPa · s) | 2.8 | 2.5 | 4.0 | 2.7 | 2.5 |
| Electroconductivity of ink (S/m) | 0.13 | 0.08 | 0.08 | 0.20 | 0.13 |
| Number average dispersion particle diameter of ink (nm) | 45 | 25 | 47 | 45 | 19 |
| Particle diameter distribution | 2.1 | 1.7 | 3.1 | 2.5 | 2.1 |
| Number of particles with a size exceeding 0.5 μm (×10$^{10}$) | 2.3 | 0.5 | 4.8 | 2.8 | 0.4 |
| Fe content (ppm) | <2 | <2 | <2 | <2 | <2 |
| Mg content (ppm) | <2 | <2 | <2 | <2 | <2 |
| Amount of ink drop (ng) | 32 | 28 | 26 | 28 | 33 |
| Drying time test (s) | 1 | 2 | 1 | 1 | 3 |
| Image quality test a) | ○ | ○ | ○ | ○ | ○ |
| Image quality test b) | ○ | ○ | ○ | ○ | ○ |
| Rubbing resistance test | ○ | ○ | ○ | ○ | ○ |
| Clogging resistance test | ○ | ○ | Δ | ○ | ○ |
| Storage stability test of ink | ○ | ○ | Δ | ○ | ○ |

|  | Ex. II-6 | Ex. II-7 | Ex. II-8 | Ex. II-9 | Ex. II-10 |
|---|---|---|---|---|---|
| Surface tension of ink (mN/m) | 38 | 33 | 37 | 18 | 33 |
| Viscosity of ink (mPa · s) | 1.7 | 2.2 | 2.6 | 2.6 | 2.2 |
| Electroconductivity of ink (S/m) | 0.37 | 0.15 | 0.26 | 0.17 | 0.11 |
| Number average dispersion particle diameter of ink (nm) | 70 | 50 | 44 | 47 | 22 |
| Particle diameter distribution | 2.5 | 2.4 | 2.8 | 2.6 | 1.9 |
| Number of particles with a size exceeding 0.5 μm (×10$^{10}$) | 4.6 | 2.6 | 1.7 | 4.0 | 0.4 |
| Fe content (ppm) | <2 | <2 | <2 | <2 | <2 |
| Mg content (ppm) | <2 | <2 | <2 | <2 | <2 |
| Amount of ink drop (ng) | 31 | 29 | 27 | 25 | 28 |
| Drying time test (s) | 2 | 3 | 3 | 4 | 2 |
| Image quality test a) | ○ | ○ | ○ | Δ | ○ |
| Image quality test b) | ○ | ○ | ○ | Δ | ○ |
| Rubbing resistance test | ○ | ○ | ○ | ○ | ○ |
| Clogging resistance test | ○ | ○ | ○ | ○ | ○ |
| Storage stability test of ink | ○ | ○ | ○ | Δ | ○ |

|  | Ex. II-11 | Ex. II-12 | Ex. II-13 | Ex. II-14 | Ex. II-15 |
|---|---|---|---|---|---|
| Surface tension of ink (mN/m) | 29 | 31 | 36 | 37 | 36 |
| Viscosity of ink (mPa · s) | 2.4 | 3.0 | 2.7 | 2.5 | 2.7 |
| Electroconductivity of ink (S/m) | 0.38 | 0.22 | 0.32 | 0.13 | 0.33 |
| Number average dispersion particle diameter of ink (nm) | 36 | 47 | 87 | 20 | 110 |
| Particle diameter distribution | 2.4 | 3.1 | 2.4 | 2.1 | 3.2 |
| Number of particles with a size exceeding 0.5 μm (×10$^{10}$) | 1.5 | 2.7 | 3.7 | 1.2 | 8.0 |
| Fe content (ppm) | <2 | <2 | <2 | <2 | 12 |
| Mg content (ppm) | <2 | <2 | <2 | <2 | 7 |
| Amount of ink drop (ng) | 31 | 31 | 25 | 27 | 28 |
| Drying time test (s) | 1 | 2 | 1 | 2 | 1 |
| Image quality test a) | ○ | ○ | ○ | ○ | ○ |
| Image guality test b) | ○ | ○ | ○ | ○ | ○ |
| Rubbing resistance test | ○ | ○ | ○ | ○ | Δ |
| Clogging resistance test | ○ | ○ | ○ | ○ | Δ |
| Storage stability test of ink | ○ | Δ | ○ | ○ | Δ |

|  | E. II-16 | C.E. II-1 | C.E. II-2 | C.E. II-3 |
|---|---|---|---|---|
| Surface tension of ink (mN/m) | 32 | 60 | 30 | 34 |
| Viscosity of ink (mPa · s) | 2.3 | 2.4 | 3.4 | 1.9 |
| Electroconductivity of ink (S/m) | 0.08 | 0.15 | 0.22 | 0.26 |
| Number average dispersion particle diameter of ink (nm) | 26 | 46 | 70 | 65 |
| Particle diameter distribution | 1.7 | 2.1 | 3.1 | 2.7 |
| Number of particles with a size exceeding 0.5 μm (×10$^{10}$) | 0.6 | 2.2 | 15.5 | 4.1 |
| Fe content (ppm) | <2 | <2 | <2 | <2 |
| Mg content (ppm) | <2 | <2 | <2 | <2 |
| Amount of ink drop (ng) | 30 | 33 | 27 | 31 |
| Drying time test (s) | 20 | 30 | 2 | 20 |
| Image quality test a) | X | ○ | ○ | ○ |
| Image quality test b) | Δ | ○ | ○ | ○ |
| Rubbing resistance test | X | X | ○ | X |
| Clogging resistance test | ○ | ○ | X | ○ |
| Storage stability test of ink | ○ | ○ | X | Δ |

Example II-17

The ink of Example II-1 and inks having the following compositions are used to make the following evaluation.

Cyan ink

| Component | Parts by weight |
|---|---|
| Dye Project Fast Cyan.2 (manufactured by ZENECA) | 4 |
| Butylcarbitol | 5 |
| Thiodiethanol | 15 |
| Pure water | 76 |

The above components are sufficiently mixed and dissolved and filtered under pressure through a 0.45 μm filter to prepare an ink.

Magenta ink

An ink is prepared by using the same composition as that of the above cyan ink except that a dye Project Fast Magenta 2 is used instead of the dye Project Fast Cyan.2, the both dyes being manufactured by ZENECA. The components are sufficiently mixed and dissolved and filtered under pressure through a 0.45 μm filter to prepare an ink.

Yellow ink

An ink is prepared by using the same composition as that of the above cyan ink except that a dye Project Fast Yellow 2 is used instead of the dye Project Fast Cyan.2, the both dyes being manufactured by ZENECA. The components are sufficiently mixed and dissolved and filtered under pressure through a 0.45 μm filter to prepare an ink.

(13) Image registration quality test

The prepared inks are subjected to a printing test in which one dot line of a black color on the color background and a solid image pattern in which each color are arranged adjacent to each other are printed on FX-L paper (manufactured by Fuji Xerox) used as the typical regular paper by using a thermal ink jet printer having a resolution of 600 dpi which is experimentally produced for the evaluation. A blur of the line and the uniformity of the portion adjacent to the solid image are observed as the evaluation items and are rated according to the following basis.

a) Blur of the line

○: No blur is found.

Δ: A slight blur is found.

×: A mustache-like blur is observed in many parts.

b) Uniformity of the solid

○: No disorder is found.

Δ: Slight disorder is found.

×: The solid is rough and deficient in smoothness.

All of the evaluation results are "○".

Example II-18

Using the ink of Example II-1 and a fixing agent having the following composition, the following evaluation is made.

| Component | Parts by weight |
| --- | --- |
| Styrene-Na maleate copolymer | 4 |
| Diethylene glycol | 15 |
| Polyoxyethylene lauryl ether (HLB: about 8) | 0.1 |
| Isopropyl alcohol | 2 |
| Pure water | 79 |

Using a thermal ink jet printer having a resolution of 600 dpi which is experimentally produced for the evaluation, the ink of Example II-1 is printed in a registrational manner on the fixing agent A within 5 seconds after the fixing agent A is jetted to make the same evaluation as in the image quality test (9) and the rubbing resistance test (10). The combination of the ink of Example II-1 and the fixing agent A exhibits an image density higher than the ink of Example II-1 alone. Also, the results of the image quality test and rubbing resistance test are all "○" which means good.

Example II-19

Using the ink of Example II-2 and a fixing agent having the following composition, the following evaluation is made.

Fixing agent B

| Component | Parts by weight |
| --- | --- |
| Stearyltrimethylammonium chloride | 1 |
| Polyallylamine hydrochloride | 5 |
| Glycerin | 20 |
| Pure water | 74 |

The same evaluation as in Example II-18 is made. The combination of the ink of Example II-2 and the fixing agent B exhibits an image density higher than the ink of Example II-2 alone. Also, the results of the image quality test and rubbing resistance test are all "○" which means good.

What is claimed is:

1. An ink jet recording ink comprising water, an aqueous organic solvent, a surfactant and a self-dispersible pigment, wherein:

(a) the number average particle diameter of dispersed particles of said pigment is from 15 to 100 nm;

(b) given that mv is the volumetric average particle diameter of the dispersed particles of said pigment and mn is the number average diameter of the dispersed particles of said pigment, mv/mn is less than or equal to 3;

(c) the number of particles having a particle diameter greater than or equal to 0.5 μm among the dispersed particles of said pigment contained in one liter of said ink is less than or equal to $7.5 \times 10^{10}$;

(d) the surface tension of said ink is less than or equal to 60 mN/m as measured at 23° C.;

(e) the electroconductivity of said ink is from 0.05 to 0.4 S/m;

(f) the pH of said ink is from 6 to 11: and (g) a content of said surfactant is from 0.001 to 4.0% by weight based on the total amount of said ink.

2. An ink according to claim 1, wherein said ink has a viscosity from 1.5 to 5.0 mPa·s as measured at 23° C.

3. An ink according to claim 1, wherein said surfactant is an anionic surfactant and/or a nonionic surfactant.

4. An ink according to claim 1, wherein the drying time, when a solid image at an image area ratio of 100% is printed on regular paper, is less than 10 seconds.

5. An ink according to claim 1, wherein each amount of Ca, Fe and Si contained in said ink is less than or equal to 10 ppm.

6. An ink according to claim 1, wherein said self-dispersible pigment is produced by making carbon black hydrophilic.

7. An ink according to claim 1, wherein the number average particle diameter of the dispersed particles of said pigment is from 15 to 60 nm, and mv/mn is less than or equal to 2.2.

8. An ink according to claim 1, further comprising a monohydric alcohol.

9. An ink according to claim 1, wherein the surface tension of said ink is from 20 to 40 mN/m as measured at 23° C., and the content of said surfactant is from 0.5 to 4.0% by weight based on the total amount of said ink.

10. An ink according to claim 9, wherein the drying time, when a solid image whose image area ratio is 100% is printed on regular paper, is less than 5 seconds.

11. A method for producing the ink according to claim 1, said method comprising at least a step of dispersing a self-dispersible pigment by using at least one of an ultrasonic homogenizer and a high pressure homogenizer.

12. A method for producing the ink according to claim 1, said method comprising at least a step of removing bulky particles by centrifugation.

13. An ink jet recording method for forming an image on a recording medium comprising jetting ink droplets from an orifice in accordance with a recording signal, wherein said ink comprises the ink according to claim 1.

14. A method according to claim 13, wherein one or more aqueous solutions containing a fixing agent is applied to a position and/or a portion adjacent thereto on the recording medium at which an image is formed, at least one of before, after, or at the same time as the ink reaches the recording medium.

15. A method according to claim 14, wherein said fixing agent is an aqueous polymer and/or a polymer emulsion.

16. A method according to claim 14, wherein said aqueous solution further comprises a surfactant and has a surface tension of 20 to 39 mN/m as measured at 23° C. and a viscosity of 1.5 to 5 mPa·s as measured at 23° C.

17. A method according to claim 14, wherein said pigment in said ink comprises an anionic, hydrophilic functional group, and said aqueous solution comprises a nonionic surfactant and/or a cationic surfactant and (a) a fixing agent comprising an aqueous polymer or a polymer emulsion having a cationic group and/or (b) a fixing agent comprising an inorganic polyvalent cation.

18. An ink jet recording ink comprising water, an aqueous organic solvent, a surfactant a self-dispersible pigment and urea or urea derivatives, wherein:

(a) the number average particle diameter of dispersed particles of said pigment is from 15 to 100 nm.

(b) given that mv is the volumetric average particle diameter of the dispersed particles of said pigment and mn is the number average diameter of the dispersed particles of said pigment, mv/mn is less than or equal to 3;

(c) the number of particles having a particle diameter greater than or equal to 0.5 $\mu$m among the dispersed particles of said pigment contained in one liter of said ink is less than or equal to $7.5 \times 10^{10}$;.

(d) the surface tension of said ink is less than or equal to 60 mN/m as measured at 23° C., (e) the electroconductivity of said ink is from 0.05 to 0.4 S/m: and (f) the pH of said ink is from 6 to 11.

* * * * *